United States Patent
Oishi et al.

(10) Patent No.: US 11,585,915 B2
(45) Date of Patent: Feb. 21, 2023

(54) COMMUNICATION DEVICE, INFORMATION PROCESSING METHOD, AND NON-TRANSITORY COMPUTER READABLE STORAGE MEDIUM

(71) Applicants: KABUSHIKI KAISHA TOKAI RIKA DENKI SEISAKUSHO, Aichi (JP); NAGOYA INSTITUTE OF TECHNOLOGY, Aichi (JP)

(72) Inventors: Yoshiki Oishi, Aichi (JP); Kenichi Koga, Aichi (JP); Tatsuya Koike, Aichi (JP); Nobuyoshi Kikuma, Aichi (JP)

(73) Assignees: KABUSHIKI KAISHA TOKAI RIKA DENKI SEISAKUSHO, Aichi (JP); NAGOYA INSTITUTE OF TECHNOLOGY, Aichi (JP)

( * ) Notice: Subject to any disclaimer, the term of this patent is extended or adjusted under 35 U.S.C. 154(b) by 0 days.

(21) Appl. No.: 17/395,576

(22) Filed: Aug. 6, 2021

(65) Prior Publication Data
US 2022/0057502 A1 Feb. 24, 2022

(30) Foreign Application Priority Data

Aug. 21, 2020 (JP) .............................. JP2020-139856
Dec. 8, 2020 (JP) .............................. JP2020-203667

(51) Int. Cl.
*H04B 7/0456* (2017.01)
*G01S 13/532* (2006.01)
*G01S 5/02* (2010.01)

(52) U.S. Cl.
CPC .......... *G01S 13/532* (2013.01); *G01S 5/0284* (2013.01); *H04B 7/0456* (2013.01)

(58) Field of Classification Search
CPC ...... G01S 13/532; G01S 5/0284; G01S 7/003; G01S 2013/93273; G01S 13/762;
(Continued)

(56) References Cited

U.S. PATENT DOCUMENTS 7,164,706 B2 * 1/2007 Oates .................... H04B 1/707
  375/E1.031
2017/0177769 A1 * 6/2017 Bouzinov ............... G06F 17/11
(Continued)

FOREIGN PATENT DOCUMENTS

WO 2015/176776 11/2015

OTHER PUBLICATIONS

Gorodnitsky, Irina F. et al., "Sparse Signal Reconstruction from Limited Data Using FOCUSS: A Re-weighted Minimum Norm Algorithm", IEEE Transactions on Signal Processing, vol. 45, No. 3, Mar. 1997, pp. 600-616.

(Continued)

*Primary Examiner* — Kenneth T Lam
(74) *Attorney, Agent, or Firm* — Greenblum & Bernstein P.L.C.

(57) ABSTRACT

A communication device comprising: a wireless communication section; and a control section configured to correlate a first signal with a second signal from another communication device at a designated interval, convert a data matrix including an array of a plurality of correlation computation results into a format including a matrix product of an expanded modal matrix and an expanded signal matrix, estimate the expanded signal matrix that minimizes a predetermined norm, and estimate reception time of the second signal on a basis of the expanded signal matrix that minimizes the predetermined norm.

18 Claims, 16 Drawing Sheets

(58) Field of Classification Search
CPC ........ G01S 13/765; G01S 13/931; G01S 3/46;
G01S 5/0218; G01S 5/0244; G01S 5/12;
H04B 7/0456; H04B 7/043; H04B 7/0417
See application file for complete search history.

(56) References Cited

U.S. PATENT DOCUMENTS

2020/0200892 A1* 6/2020 Rajab ..................... G01S 13/82
2020/0278439 A1* 9/2020 Goto ..................... G01S 7/4026
2022/0057502 A1* 2/2022 Oishi .................. H04B 7/0456

OTHER PUBLICATIONS

Cotter, Shane F. et al., "Sparse Solutions to Linear Inverse Problems With Multiple Measurement Vectors", IEEE Transactions on Signal Processing, vol. 53, No. 7, Jul. 2005, pp. 2477-2488.

* cited by examiner

COMMUNICATION DEVICE, INFORMATION PROCESSING METHOD, AND NON-TRANSITORY COMPUTER READABLE STORAGE MEDIUM

CROSS REFERENCE TO RELATED APPLICATION(S)

This application is based upon and claims benefit of priority from Japanese Patent Application No. 2020-139856, filed on Aug. 21, 2020, and Japanese Patent Application No. 2020-203667 filed on Dec. 8, 2020, the entire contents of which are incorporated herein by reference.

BACKGROUND

The present invention relates to a communication device, an information processing method, and a storage medium.

In recent years, technologies that allow one device to determine a position of another device in accordance with a result of transmitting/receiving a signal between the devices have been developed. As an example of the technologies of determining a position, WO 2015/176776 A1 discloses a technology that allows an UWB (ultra-wideband) receiver to determine an angle of incidence of a wireless signal from an UWB transmitter by performing wireless communication section using UWB.

However, although the technology disclosed in WO 2015/176776 A1 determines the angle of incidence of the wireless signal, there is a room for improvement in accuracy of measuring a distance between the UWB receiver and the UWB transmitter.

In other words, it has been desired to further improve the accuracy of measuring a distance between devices with regard to the technologies of measuring a distance between one device and another device.

Accordingly, the present invention is made in view of the aforementioned issues, and an object of the present invention is to provide a mechanism that makes it possible to improve accuracy of measuring a distance between a plurality of devices.

SUMMARY

To solve the above described problem, according to an aspect of the present invention, there is provided a communication device comprising: a wireless communication section configured to wirelessly receive a signal from another communication device; and a control section configured to correlate a first signal with a second signal at a designated interval, convert a data matrix into a format including a matrix product of an expanded modal matrix and an expanded signal matrix, estimate the expanded signal matrix that minimizes a predetermined norm, and estimate reception time of the second signal on a basis of the expanded signal matrix that minimizes the predetermined norm, wherein the second signal is a signal corresponding to the first signal and is received by the wireless communication section in a case where the other communication device transmits a signal including a pulse as the first signal, the data matrix is a matrix including an array of a plurality of correlation computation results, each of which is a result obtained by correlating the first signal with the second signal at the designated interval with regard to the wireless communication section, the expanded modal matrix is a matrix including a plurality of elements indicating the correlation computation results obtained on an assumption that the signal is received at respective set times, the expanded signal matrix is a matrix including expanded signal vectors arranged with respect to the plurality of correlation computation results, and the expanded signal vector is a vector including a plurality of elements, each of which indicates presence/absence of the signal obtained by the wireless communication section at each of the set times and amplitude and phase of the signal.

To solve the above described problem, according to another aspect of the present invention, there is provided an information processing method comprising: correlating a first signal with a second signal at a designated interval; converting a data matrix into a format including a matrix product of an expanded modal matrix and an expanded signal matrix; estimating the expanded signal matrix that minimizes a predetermined norm; and estimating reception time of the second signal on a basis of the expanded signal matrix that minimizes the predetermined norm, wherein the second signal is a signal corresponding to the first signal and is received by a wireless communication section in a case where another communication device transmits a signal including a pulse as the first signal, the data matrix is a matrix including an array of a plurality of correlation computation results, each of which is a result obtained by correlating the first signal with the second signal at the designated interval with regard to the wireless communication section, the expanded modal matrix is a matrix including a plurality of elements indicating the correlation computation results obtained on an assumption that the signal is received at respective set times, the expanded signal matrix is a matrix including expanded signal vectors arranged with respect to the plurality of correlation computation results, and the expanded signal vector is a vector including a plurality of elements, each of which indicates presence/absence of the signal obtained by the wireless communication section at each of the set times and amplitude and phase of the signal.

To solve the above described problem, according to another aspect of the present invention, there is provided a non-transitory computer readable storage medium having a program stored therein, the program causing a computer to function as a control section configured to correlate a first signal with a second signal at a designated interval, convert a data matrix into a format including a matrix product of an expanded modal matrix and an expanded signal matrix, estimate the expanded signal matrix that minimizes a predetermined norm, and estimate reception time of the second signal on a basis of the expanded signal matrix that minimizes the predetermined norm, wherein the second signal is a signal corresponding to the first signal and is received by a wireless communication section in a case where another communication device transmits a signal including a pulse as the first signal, the data matrix is a matrix including an array of a plurality of correlation computation results, each of which is a result obtained by correlating the first signal with the second signal at the designated interval with regard to the wireless communication section, the expanded modal matrix is a matrix including a plurality of elements indicating the correlation computation results obtained on an assumption that the signal is received at respective set times, the expanded signal matrix is a matrix including expanded signal vectors arranged with respect to the plurality of correlation computation results, and the expanded signal vector is a vector including a plurality of elements, each of which indicates presence/absence of the signal obtained by the wireless communication section at each of the set times and amplitude and phase of the signal.

As described above, according to the present invention, it is possible to provide the mechanism that makes it possible to improve accuracy of estimating a distance between a plurality of devices.

DETAILED DESCRIPTION OF THE EMBODIMENT(S)

Figure 1:
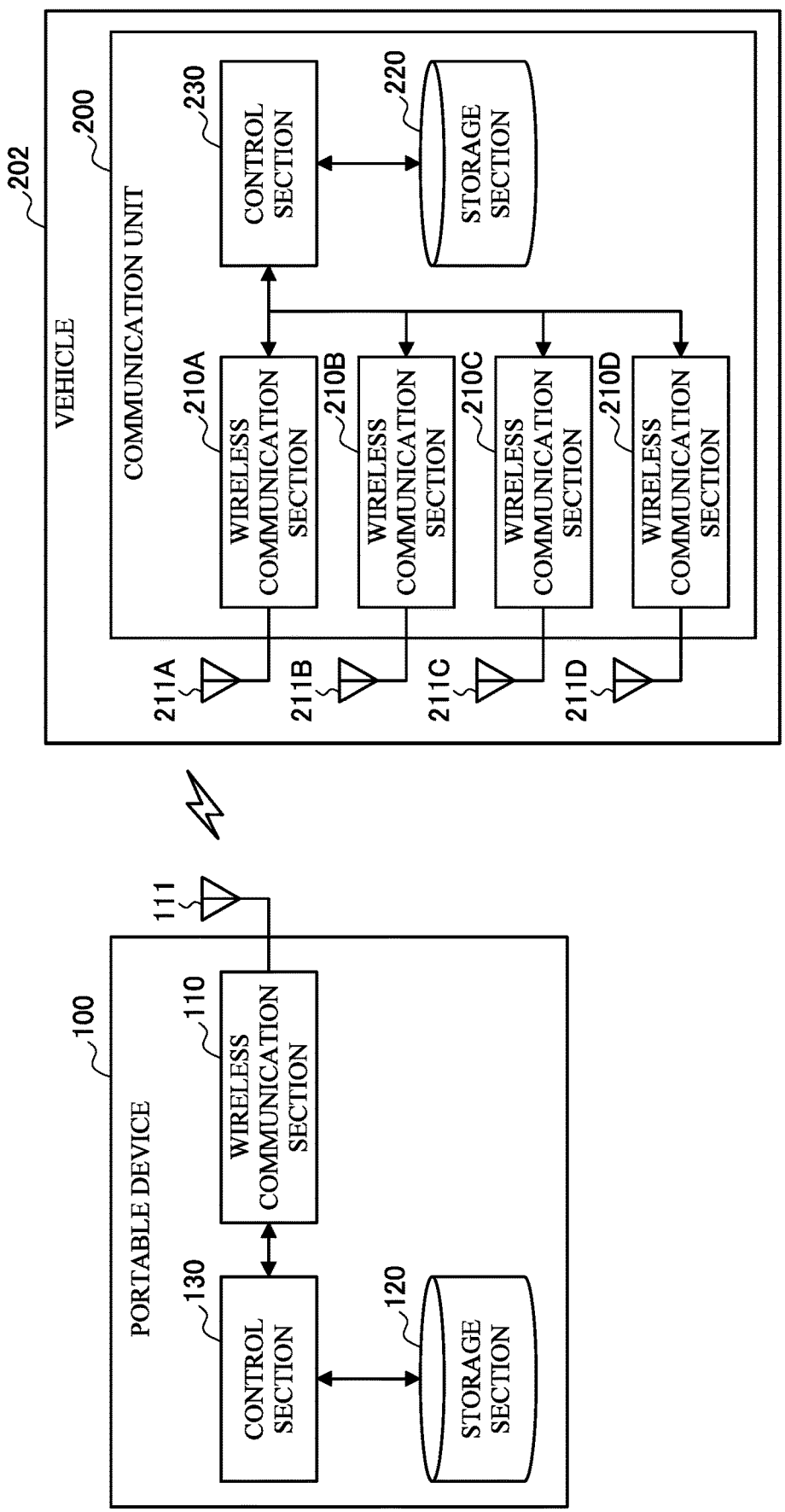
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication sections 210A, 210B, and 210C, as necessary. However, when there is no need in particular to distinguish structural elements that have substantially the same functional configuration, the same reference numeral alone is attached. For example, in a case in which it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present embodiment. In the example illustrated in FIG. 1, the portable device 100 is an example of the communication device of the authenticatee, and the communication unit 200 is an example of the communication device of the authenticator.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 or starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 receives a wireless signal from the communication unit 200 installed in the vehicle 202 and transmits the wireless signal.

For example, wireless communication is performed between the wireless communication section 110 and the communication unit 200 by using an ultra-wideband (UWB) signal, for example. In the wireless communication of the UWB signal, it is possible for impulse UWB to measure propagation delay time of a radio wave with high accuracy by using the radio wave of ultra-short pulse width of a nanosecond or less, and it is possible to perform ranging with high accuracy on the basis of the propagation delay time. Note that, the propagation delay time is time from transmission to reception of the radio wave. The wireless communication section 110 is configured as a communication interface that makes it possible to perform communication by using the UWB signals, for example.

Note that, the UWB signal may be transmitted/received as a ranging signal, an angle estimation signal, and a data signal, for example. The ranging signal is a signal transmitted and received in the ranging process (to be described later). The ranging signal may be configured in a frame format that does not include a payload part for storing data or in a frame format that includes the payload part. The angle estimation signal is a signal transmitted and received in an angle estimation process (to be described later). The angle estimation signal may be configured in a way similar to the ranging signal. The data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, or the like. For example, the storage section 120 includes a storage medium such as flash memory and a processing device that performs recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120 and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that communication section 200 is installed in a vehicle interior of the vehicle 202, the communication section 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a plurality of wireless communication sections 210 (210A to 210D), a storage section 220, and a control section 230.

The wireless communication section 210 has a function of performing wireless communication with the wireless communication section 110 of the portable device 100. The wireless communication section 210 receives a wireless signal from the portable device 100 and transmits a wireless signal to the portable device 100. The wireless communication section 210 is configured as a communication interface that makes it possible to perform communication by using the UWB signals, for example.

Here, each of the wireless communication sections 210 includes an antenna 211. In addition, each of the wireless communication sections 210 transmits/receives a wireless signal via the antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. For example, the control section 230 controls the wireless communication sections 210 to perform communication with the portable device 100. The control section 230 reads information from the storage section 220 and writes information into the storage section 220. The control section 230 also functions as an authentication control section that controls the authentication process between the mobile device 100 and the control system 100 of the vehicle 200. In addition, the control section 230 also functions as a door lock control section that controls the door key of the vehicle 202, and locks and unlocks doors with the door key. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Technical Features

<2.1. Positional Parameter>

The communication unit 200 (specifically, control section 230) according to the present embodiment performs a positional parameter estimation process of estimating a positional parameter that represents a position of the portable device 100. Hereinafter, with reference to FIG. 2 to FIG. 4, various definitions related to the positional parameter will be described.

Figure 2:
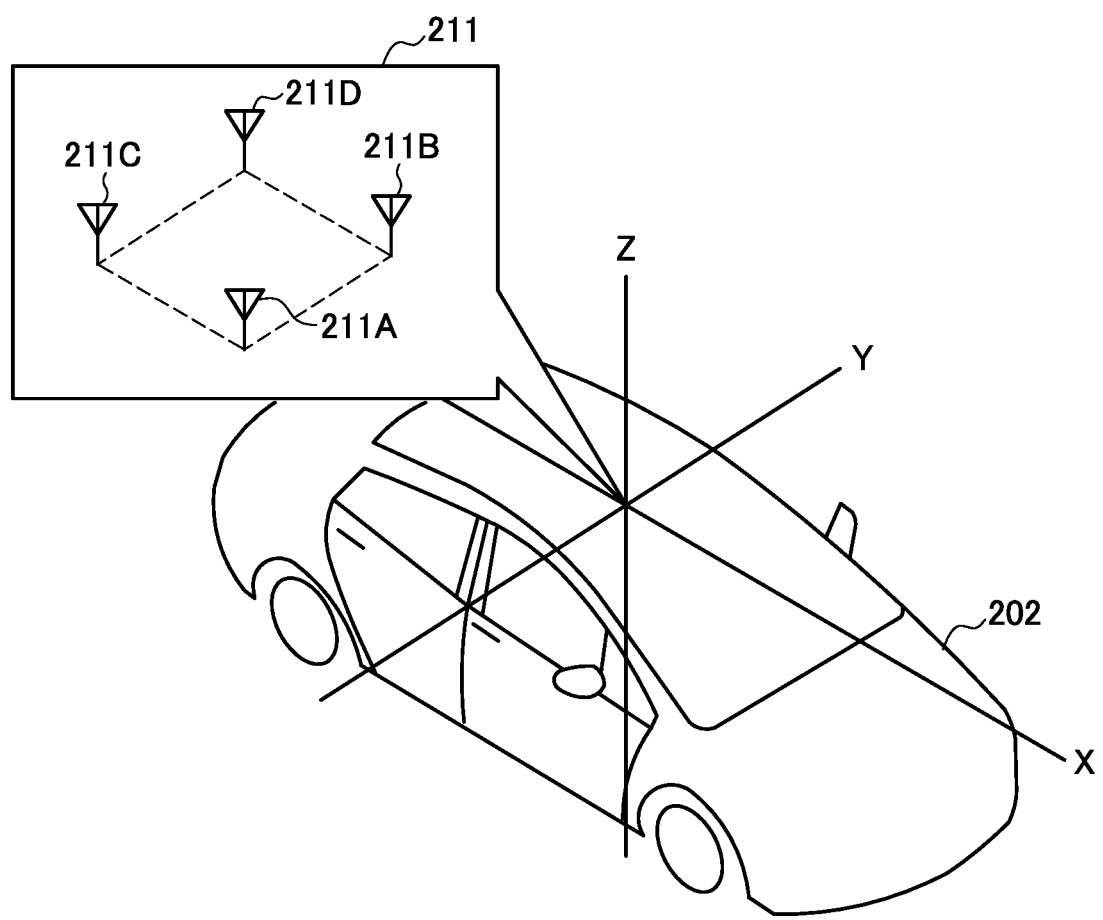
FIG. 2 is a diagram illustrating an example of arrangement of a plurality of antennas installed in a vehicle according to the embodiment.

FIG. 2 is a diagram illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, a distance between adjacent antennas 211 are set to half or less of wavelength A of an angle estimation signal (to be described later). A local coordinate system of the communication unit 200 is set as a coordinate system based on the communication unit 200. An example of the local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas is not limited to the square shape. The arrangement of the four antennas may be a parallelogram shape, a trapezoid shape, a rectangular shape, or any other shapes. Of course, the number of antennas 211 is not limited to four.

Figure 3:
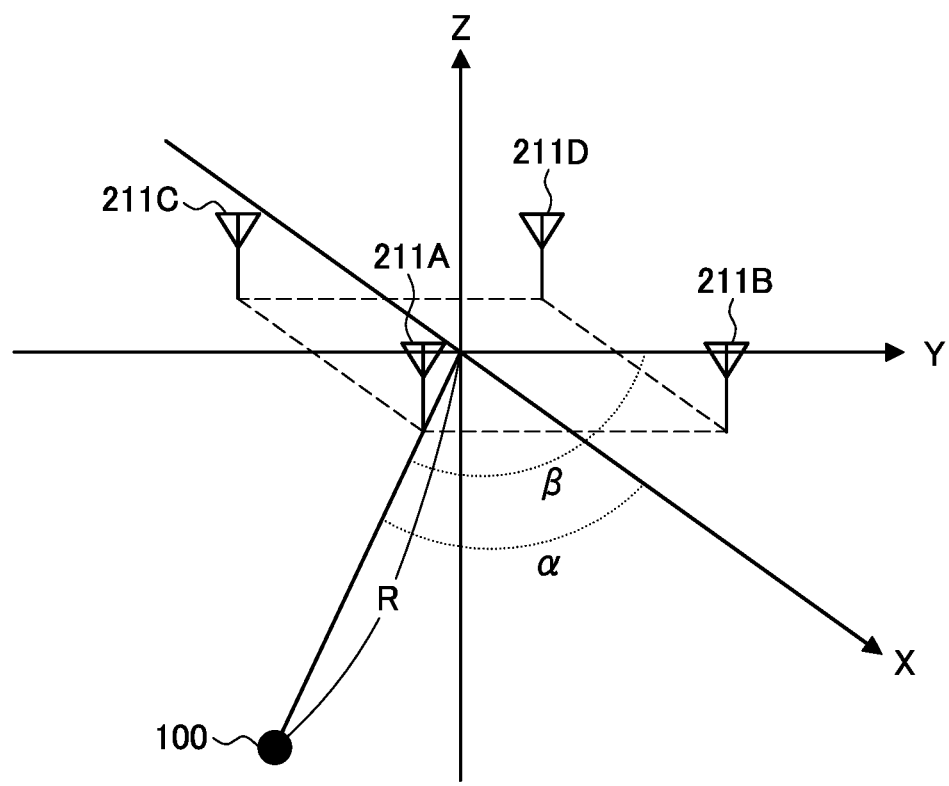
FIG. 3 is a diagram illustrating an example of a positional parameter of a portable device according to the embodiment.

FIG. 3 is a diagram illustrating an example of positional parameters of the portable device 100 according to the present embodiment. The positional parameters may include a distance R between the portable device 100 and the communication unit 200. The distance R illustrated in FIG. 3 is a distance from the origin of the local coordinate system of the communication unit 200 to the portable device 100. The distance R is estimated on the basis of a result of transmission/reception of a ranging signal (to be described later) between the portable device 100 and one of the plurality of wireless communication sections 210. The distance R may be a distance between the portable device 100 and the single wireless communication section 210 that transmits/receives the ranging signal (to be described later).

In addition, as illustrated in FIG. 3, the positional parameters may include an angle of the portable device 100 based on the communication unit 200, the angle including an angle α between the X axis and the portable device 100 and an angle β between the Y axis and the portable device 100. The angles α and β are angles between the coordinate axes and a straight line connecting the portable device 100 with the origin on a first predetermined coordinate system. For example, the first predetermined coordinate system is the local coordinate system of the communication unit 200. The angle α is an angle between the X axis and the straight line connecting the portable device 100 with the origin. The angle β is an angle between the Y axis and the straight line connecting the portable device 100 with the origin.

Figure 4:
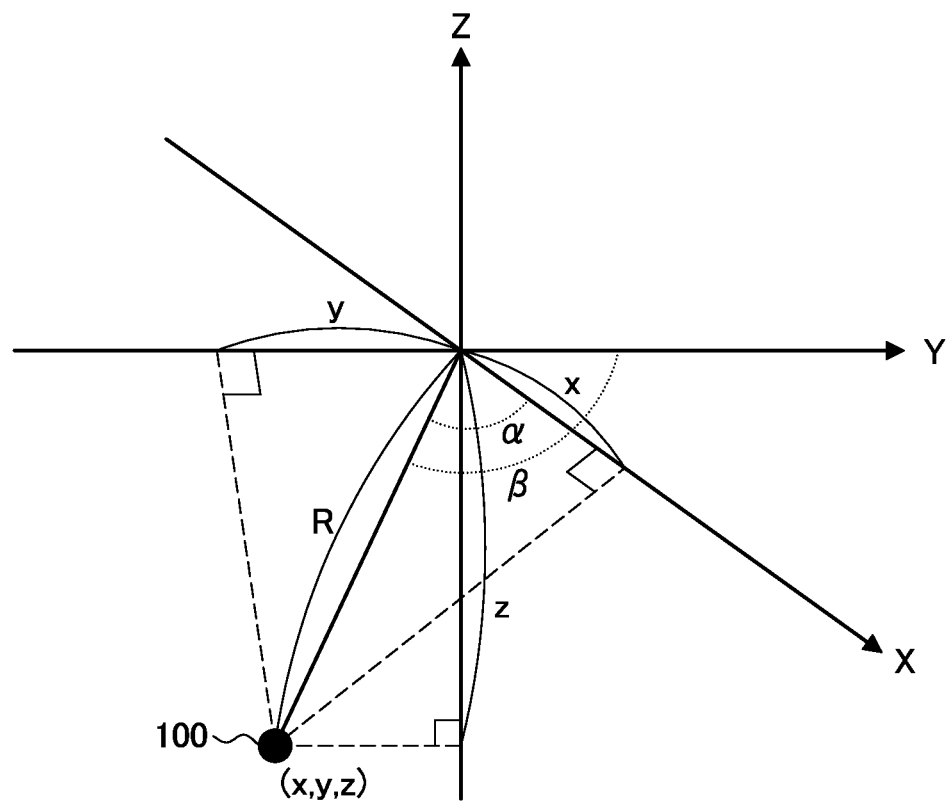
FIG. 4 is a diagram illustrating an example of the positional parameter of the portable device according to the embodiment.

FIG. 4 is a diagram illustrating an example of positional parameters of the portable device 100 according to the present embodiment. The positional parameters may include coordinates of the portable device 100 in a second predetermined coordinate system. In FIG. 4, a coordinate x on the X axis, a coordinate y on the Y axis, and a coordinate z on the Z axis of the portable device 100 are an example of such coordinates. In other words, the second predetermined coordinate system may be the local coordinate system of the communication unit 200. Alternatively, the second predetermined coordinate system may be a global coordinate system.

<2.2. CIR>
(1) CIR Calculation Process

In the positional parameter estimation process, the portable device 100 and the communication unit 200 communicate with each other to estimate the positional parameters. At this time, the portable device 100 and the communication unit 200 calculates channel impulse responses (CIRs).

The CIR is a response obtained when an impulse is input to the system. In the case where a wireless communication section of one of the portable device 100 and the communication unit 200 (hereinafter, also referred to as a transmitter) transmits a signal including a pulse as a first signal, the CIR according to the present embodiment is calculated on the basis of a second signal that corresponds to the first signal and that is received by a wireless communication section of the other (hereinafter, also referred to as a receiver). It can be said that the CIR indicates characteristics of a wireless communication path between the portable device 100 and the communication unit 200. Hereinafter, the first signal is also referred to as a transmission signal, and the second signal is also referred to as a reception signal.

For example, the CIR may be a correlation computation result that is a result obtained by correlating the transmission signal with the reception signal at each designated interval. Here, the correlation may be sliding correlation that is a process of correlating the transmission signal with the reception signal by shifting relative positions of the signals in time directions. The CIR includes a correlation value indicating a degree of the correlation between the transmission signal and the reception signal as an element obtained at each designated interval. The designated interval is an interval between timings at which the receiver samples the reception signal. Therefore, an element included in the CIR is also referred to as a sampling point. The correlation value may be a complex number including the IQ components. In addition, the correlation value may be a phase or amplitude of a complex number. In addition, the correlation value may be electric power that is a sum of squares of an I component and a Q component of the complex number (or square of amplitude).

The CIR is also considered as a set of elements that are values obtained at respective times (hereinafter, also referred to as CIR values). In this case, the CIR is chronological variation in the CIR value. In the case where the CIR is the correlation computation result, the CIR value is the correlation value.

Note that, the portable device 100 and the communication unit 200 acquire time by using a time counter. The time counter is a counter that counts (typically, increments) a value (hereinafter, also referred to as count value) indicating elapsed time obtained at a predetermined time interval (hereinafter, also referred to as count cycle). A current time is calculated by the count value counted by the time counter, the count cycle, and a count start time. If different devices have a same count cycle and a same count start time, this means that these devices are in synchronization with each other. On the other hand, if at least any of the count cycle and the count start time is different between the different devices, this means that these devices are not in synchronization with each other or are asynchronous with each other. The portable device 100 and the communication unit 200 may be in synchronization with each other or asynchronous with each other. In addition, the plurality of wireless communication sections 210 may be in synchronization with each other or asynchronous with each other. The designated interval used when calculating the CIR may be an integer multiple of the count cycle of the time counter. Hereinafter, description will be given on an assumption that the portable device 100 and the plurality of wireless communication sections 210 are in synchronization with each other unless otherwise noted.

Hereinafter, with reference to FIG. 5 to FIG. 6, a CIR calculation process performed in the case where the portable device 100 serves as the transmitter and the communication unit 200 serves as the receiver will be described in detail.

Figure 5:
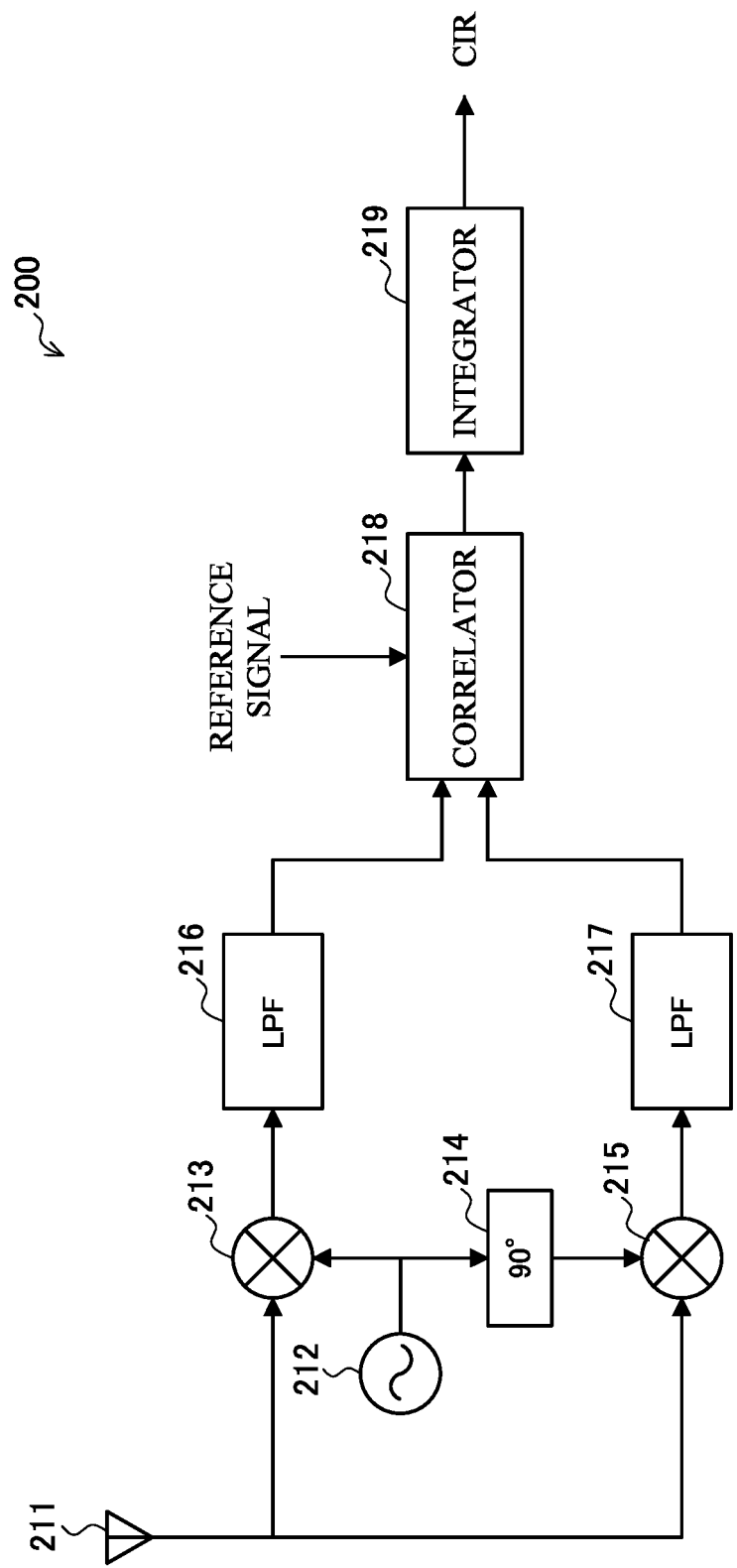
FIG. 5 is a diagram illustrating an example of processing blocks for signal processing in a communication unit according to the embodiment.

FIG. 5 is a diagram illustrating an example of processing blocks for signal processing in the communication unit 200 according to the present embodiment. As illustrated in FIG. 5, the communication unit 200 includes an oscillator 212, a multiplier 213, a 90-degree phase shifter 214, a multiplier 215, a low pass filter (LPF) 216, a LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 and the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delated signal to the multiplier 215. The multiplier 215 multiplies the reception signal received by the antenna 211 and the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Here, the transmitter may transmit a signal including a preamble as the transmission signal. The preamble includes a plurality of preamble symbols. The preamble is a sequence known to the transmitter and the receiver. Typically, the preamble is arranged at a head of the transmission signal. The preamble symbol is a pulse sequence including one or more pulses. The pulse sequence is a set of the plurality of pulses that are separate from each other in the time direction. The preamble symbol is a target of integration performed by the integrator 219. Therefore, the correlator 218 calculates the CIR for each of the preamble symbols by correlating the preamble symbol included in the transmission signal (that is, reference signal) with respective portion corresponding to the plurality of preamble symbols included in the reception signal through the sliding correlation. Next, the integrator 219 outputs integrated CIRs by integrating the CIRs of the respective preamble symbols with regard to the one or more preamble symbols included in the preamble.

(2) Example of CIR

Figure 6:
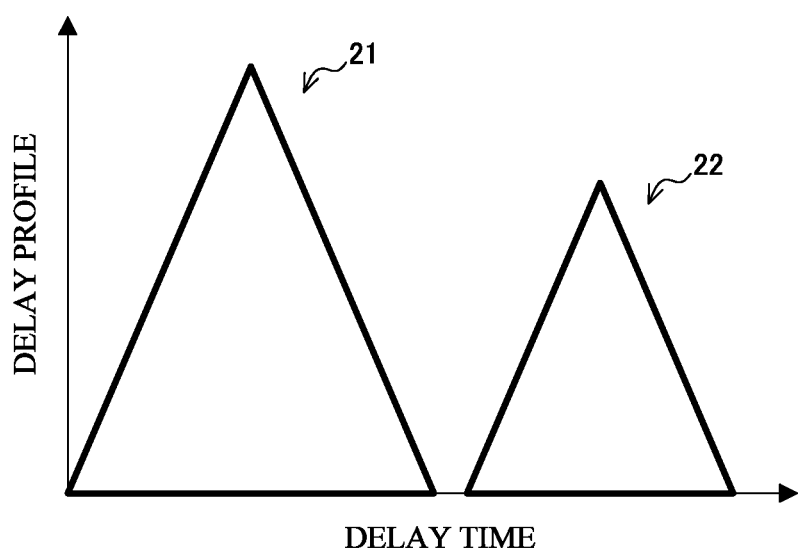
FIG. 6 is a graph illustrating an example of a CIR according to the embodiment.

FIG. 6 illustrates an example of the CIR output from the integrator 219. FIG. 6 is a graph illustrating the example of the CIR according to the present embodiment. The CIR illustrated in FIG. 6 is a CIR obtained on an assumption that the count start time of the time counter is time when the transmitter has transmitted the transmission signal. Such a CIR is also referred to as delay profile. The graph includes a horizontal axis representing delay time. The delay time is time elapsed after the time when the transmitter has transmitted the transmission signal. The graph includes a vertical axis representing absolute values of CIR values (such as electric power value). Note that, hereinafter, description will be given on an assumption that the CIR means the delay profile.

The shape of CIR, more specifically, the shape of chronological change in the CIR value is also referred to as a CIR waveform. Typically, a set of elements obtained between a zero-crossing and another zero-crossing corresponds to a single pulse with regard to the CIR. The zero-crossing is an element whose value is zero. However, the same does not apply to an environment with noise. For example, a set of elements obtained between intersections of a standard with chronological change in the CIR value may be treated as corresponding to the single pulse. The CIR illustrated in FIG. 6 includes a set 21 of elements corresponding to a certain pulse, and a set 22 of elements corresponding to another pulse.

For example, the set 21 corresponds to a signal (such as pulse) that reaches the receiver through a first path. The first path is a shortest path between the transmitter and the receiver. In an environment that includes no obstacle, the first path is a straight path between the transmitter and the receiver. For example, the set 22 corresponds to a signal (such as pulse) that reaches the receiver through a path other than the first path. As described above, the signals that have passed through different paths are also referred to as multipath waves.

(3) Detection of First Incoming Wave

Among wireless signals received from the transmitter, the receiver detects a signal that meets a predetermined detection standard as a signal that has reached the receiver through the first path. Next, the receiver estimates the positional parameters on the basis of the detected signal. Hereinafter, the signal detected as the signal that has reached the receiver through the first path is also referred to as a first incoming wave.

The receiver detects the signal that meets the predetermined detection standard as the first incoming wave, among the received wireless signals. For example, the predetermined detection standard is a condition that the CIR value (such as amplitude or electric power) exceeds a predetermined threshold for the first time. In other words, the receiver may detect a signal corresponding to a portion of the CIR obtained when the CIR value exceeds the predetermined threshold for the first time, as the first incoming wave. Hereinafter, the predetermined threshold used for detecting the first incoming wave is also referred to as a first path threshold.

The signal received by the receiver may be any of a direct wave, a delayed wave, or a combined wave. The direct wave is a signal that is received by the receiver through a shortest path between the transmitter and the receiver. In other words, the direct wave is a signal that reaches the receiver through the first path. The delayed wave is a signal that reaches the receiver through a path different from the shortest path between the transmitter and the receiver, that is, through a path other than the first path. The delayed wave is received by the receiver after being delayed behind the direct wave. The combined wave is a signal received by the receiver in a state where a plurality of signals that have passed through a plurality of different paths are combined.

Here, it should be noted that the signal detected as the first incoming wave is not necessarily the direct wave. For example, if the direct wave is received in a state where the direct wave and the delayed wave annihilate each other, sometimes a CIR value of an element corresponding to the direct wave falls below the predetermined threshold and the direct wave is not detected as the first incoming wave. In this case, the combined wave or the delayed wave coming while being delayed behind the direct wave is detected as the first incoming wave.

<2.3. Estimation of Positional Parameter>

(1) Distance Estimation

The communication unit 200 performs the ranging process. The ranging process is a process of estimating a distance between the communication unit 200 and the portable device 100. For example, the distance between the communication unit 200 and the portable device 100 is the distance R illustrated in FIG. 3. The ranging process includes transmission/reception of a ranging signal and calculation of the distance R based on propagation delay time of the ranging signal. The propagation delay time is time from transmission to reception of the signal.

Here, the ranging signal is transmitted/received by one of the plurality of wireless communication sections 210 of the communication unit 200. Hereinafter, the wireless communication section 210 that transmits/receives the ranging signal is also referred to as a master. The distance R is a distance between the wireless communication section 210 serving as the master (more precisely, the antenna 211) and the portable device 100.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. In addition, a ranging signal transmitted as a response to the second ranging signal from the device that has received the second ranging signal to the device that has transmitted the second ranging signal is also referred to as a third ranging signal.

Next, with reference to FIG. 7, an example of a flow of the ranging process will be described.

Figure 7:
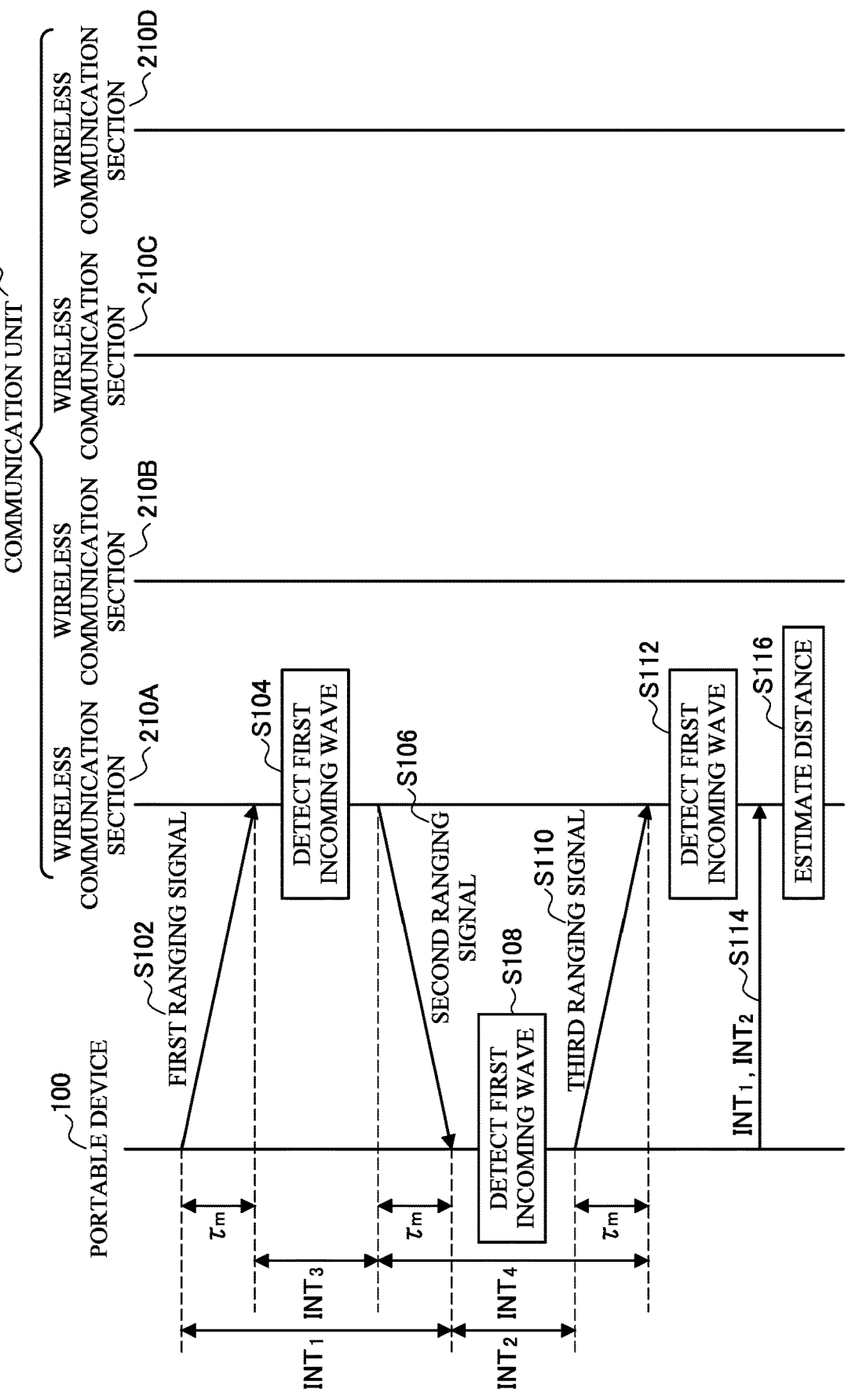
FIG. 7 is a sequence diagram illustrating an example of a flow of a ranging process performed by the system according to the embodiment.

FIG. 7 is a sequence diagram illustrating the example of the flow of the ranging process executed in the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (Step S102). When the wireless communication section 210A receives the first ranging signal, the control section 230 calculates a CIR of the first ranging signal. Next, the control section 230 detects a first incoming wave of the first ranging signal of the wireless communication section 210A on the basis of the calculated CIR (Step S104).

Next, the wireless communication section 210A transmits the second ranging signal in response to the first ranging signal (Step S106). When the second ranging signal is received, the portable device 100 calculates a CIR of the second ranging signal. Next, the portable device 100 detects a first incoming wave of the second ranging signal on the basis of the calculated CIR (Step S108).

Next, the portable device 100 transmits the third ranging signal in response to the second ranging signal (Step S110). When the wireless communication section 210A receives the third ranging signal, the control section 230 calculates a CIR of the third ranging signal. Next, the control section 230 detects a first incoming wave of the third ranging signal of the wireless communication section 210A on the basis of the calculated CIR (Step S112).

The portable device 100 measures an interval $INT_1$ from transmission time of the first ranging signal to reception time of the second ranging signal, and an interval $INT_2$ from reception time of the second ranging signal to transmission time of the third ranging signal. Here, the reception time of the second ranging signal is reception time of the first incoming wave of the second ranging signal detected in Step S108. Next, the portable device 100 transmits a signal including information indicating the interval $INT_1$ and the interval $INT_2$ (Step S114). For example, such a signal is received by the wireless communication section 210A.

The control section 230 measures an interval $INT_3$ from reception time of the first ranging signal to transmission time of the second ranging signal, and an interval $INT_4$ from transmission time of the second ranging signal to reception time of the third ranging signal. Here, the reception time of the first ranging signal is reception time of the first incoming wave of the first ranging signal detected in Step S104. In a similar way, the reception time of the third ranging signal is reception time of the first incoming wave of the third ranging signal detected in Step S112.

Next, the control section 230 estimates the distance R on the basis of the intervals $INT_1$, $INT_2$, $INT_3$, and $INT_4$ (Step S116). For example, the control section 230 estimates propagation delay time $\tau_m$ by using an equation listed below.

$$\tau_m = \frac{INT_1 \times INT_4 - INT_2 \times INT_3}{INT_1 + INT_2 + INT_3 + INT_4} \tag{1}$$

Next, the control section 230 estimates the distance R by multiplying the estimated propagation delay time $\tau_m$ by speed of the signal.

Cause of Reduction in Accuracy of Estimation

The reception times of the ranging signals serving as start or end of the intervals $INT_1$, $INT_2$, $INT_3$, and $INT_4$ are reception times of the first incoming waves of the ranging signals. As described above, the signal detected as the first incoming wave is not necessarily the direct wave.

In the case where the combined wave or the delayed wave coming while being delayed behind the direct wave is detected as the first incoming wave, reception time of the first incoming wave is delayed in comparison with the case where the direct wave is detected as the first incoming wave. In this case, an estimation result of the propagation delay time $\tau_m$ is changed from a true value (an estimation result of propagation delay time t obtained in the case where the direct wave is detected as the first incoming wave). In addition, this change deteriorates the accuracy of ranging.

Supplement

Note that, the receiver may treat the time of meeting the predetermined detection standard as the time of receiving the first incoming wave. In other words, the receiver may treat time when the electric power value of the CIR exceeds the predetermined threshold for the first time or time when the reception electric power value of the wireless signal exceeds the predetermined threshold for the first time, as the time of receiving the first incoming wave. Alternatively, the receiver may treat time of a peak of the detected first incoming wave (that is, time when the highest electric power value is obtained with regard to a portion of the CIR corresponding to the first incoming wave, or time when the highest reception electric power value is obtained with regard to the first incoming wave), as the time of receiving the first incoming wave.

(2) Angle Estimation

The communication unit 200 performs the angle estimation process. The angle estimation process is a process of estimating the angles α and β illustrated in FIG. 3. The angle estimation process includes reception of an angle estimation signal and calculation of the angles α and β on the basis of a result of reception of the angle estimation signal. The angle estimation signal is a signal transmitted and received in the angle estimation process. Next, with reference to FIG. 8, an example of a flow of the angle estimation process will be described.

Figure 8:
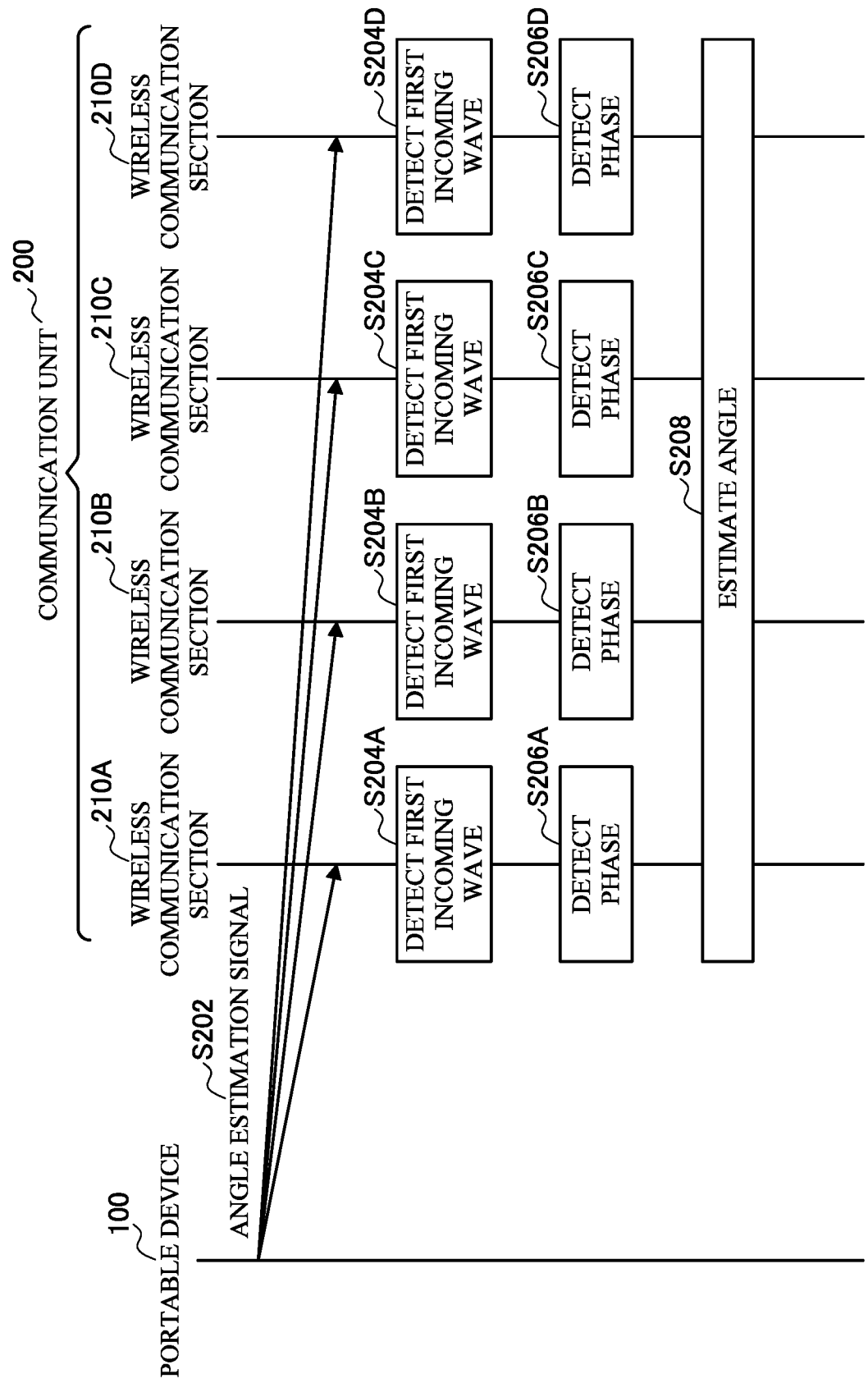
FIG. 8 is a sequence diagram illustrating an example of a flow of an angle estimation process performed in the system according to the embodiment.

FIG. 8 is a sequence diagram illustrating the example of the flow of the angle estimation process executed in the system 1 according to the present embodiment. The portable device 100 and the communication unit 200 are involved in this sequence.

As illustrated in FIG. 8, the portable device 100 first transmits the angle estimation signal (Step S202). Next, when the wireless communication sections 210A to 210D receive respective angle estimation signals, the control section 230 calculates CIRs of the respective angle estimation signals received by the wireless communication sections 210A to 210D. Next, the control section 230 detects first incoming waves of the respective angle estimation signals on the basis of the calculated CIRs with regard to the wireless communication sections 210A to 210D (Step S204A to Step S204D). Next, the control section 230 detects respective phases of the detected first incoming waves with regard to the wireless communication sections 210A to 210D (Step S206A to Step S206D). Next, the control section 230 estimates the angles $\alpha$ and $\beta$ on the basis of the respective phases of the detected first incoming waves with regard to the wireless communication sections 210A to 210D (Step S208).

Here, the phase of the first incoming wave may be phase obtained at the reception time of the first incoming wave among the CIR. Alternatively, the phase of the first incoming wave may be phase obtained at time of the reception time of the first incoming wave among the received wireless signals.

Next, details of a process in Step S208 will be described. $P_A$ represents the phase of the first incoming wave detected with regard to the wireless communication section 210A. $P_B$ represents the phase of the first incoming wave detected with regard to the wireless communication section 210B. $P_C$ represents the phase of the first incoming wave detected with regard to the wireless communication section 210C. $P_D$ represents the phase of the first incoming wave detected with regard to the wireless communication section 210D. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below.

$$Pd_{AC}=(P_A-P_C)$$

$$Pd_{BD}=(P_B-P_D)$$

$$Pd_{DC}=(P_D-P_c)$$

$$Pd_{BA}=(P_B-P_A) \quad (2)$$

The angles $\alpha$ and $\beta$ are calculated by using the following equation. Here, represents wavelength of a radio wave, and d represents a distance between antennas 211.

$$\alpha \text{ or } \beta=\arccos(\lambda \cdot Pd/(2 \cdot \pi \cdot d)) \quad (3)$$

Therefore, respective equations listed below represent angles calculated on the basis of the respective antenna array phase differences.

$$\alpha_{AC}=\arccos(\lambda \cdot Pd_{AC}/(2 \cdot \pi \cdot d))$$

$$\alpha_{BD}=\arccos(\lambda \cdot Pd_{BD}/(2 \cdot \pi \cdot d))$$

$$\beta_{DC}=\arccos(\lambda \cdot Pd_{DC}/(2 \cdot \pi \cdot d))$$

$$\beta_{BA}=\arccos(\lambda \cdot Pd_{BA}/(2 \cdot \pi \cdot d)) \quad (4)$$

The control section 230 calculates the angles $\alpha$ and $\beta$ on the basis of the calculated angles $\alpha_{AC}$, $\alpha_{BD}$, $\beta_{DC}$, and $\beta_{BA}$. For example, as expressed in the following equations, the control section 230 calculates the angles $\alpha$ and $\beta$ by averaging the angles calculated with regard to the two respective arrays in the X axis direction and the Y axis direction.

$$\alpha=(\alpha_{AC}+\alpha_{BD})/2$$

$$\beta=(\beta_{DC}+\beta_{BA})/2 \quad (5)$$

Cause of Reduction in Accuracy of Estimation

As described above, the angles $\alpha$ and $\beta$ are calculated on the basis of the phases of the first incoming waves. As described above, the signal detected as the first incoming wave is not necessarily the direct wave.

In other words, sometimes the delayed wave or the combined wave may be detected as the first incoming wave. Typically, phases of the delayed wave and the combined wave are different from the phase of the direct wave. This difference deteriorates accuracy of angle estimation.

Supplement

Note that, the angle estimation signal may be the same as the ranging signal. For example, the third ranging signal illustrated in FIG. 7 may be the same as the angle estimation signal illustrated in FIG. 8. In this case, it is possible for the communication unit 200 to calculate the distance R, the angle $\alpha$, and the angle $\beta$ by receiving a single wireless signal that serves as both the angle estimation signal and the third ranging signal.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a first calculation method and a second calculation method listed below may be adopted.

First Calculation Method

The first calculation method is a method of calculating the coordinates x, y, and z on the basis of results of the ranging process and the angle estimation process. In this case, the control section 230 first calculates the coordinates x and y by using equations listed below.

$$x=R \cdot \cos \alpha$$

$$y=R \cdot \cos \beta \quad (6)$$

Here, the distance R, the coordinate x, the coordinate y, and the coordinate z have a relation represented by an equation listed below.

$$R=\sqrt{x^2+y^2+z^2} \quad (7)$$

The control section 230 calculates the coordinate z by using the above-described relation and an equation listed below.

$$z=\sqrt{R^2-R^2 \cdot \cos^2\alpha-R \cdot \cos^2\beta} \quad (8)$$

Second Calculation Method

The second calculation method is a method of calculating the coordinates x, y, and z while omitting estimation of the angles $\alpha$ and $\beta$. First, the above-listed equations (4), (5), (6), and (7) establish a relation represented by equations listed below.

$$x/R=\cos \alpha \quad (9)$$

$$y/R=\cos \beta \quad (10)$$

$$x^2+y^2+z^2=R^2 \quad (11)$$

$$d \cdot \cos \alpha=\lambda \cdot (Pd_{AC}/2+Pd_{BD}/2)/(2 \cdot \pi) \quad (12)$$

$$d \cdot \cos \beta=\lambda \cdot (Pd_{DC}/2+Pd_{BA}/2)/(2 \cdot \pi) \quad (13)$$

The equation (12) is rearranged for cos α, and cos α is substituted into the equation (9). This makes it possible to obtain the coordinate x by using an equation listed below.

$$x = R \cdot \lambda \cdot (Pd_{AC}/2 + Pd_{BD}/2)/(2 \cdot \pi \cdot d) \quad (14)$$

The equation (13) is rearranged for cos β, and cos β is substituted into the equation (10). This makes it possible to obtain the coordinate y by using an equation listed below.

$$y = R \cdot \lambda \cdot (Pd_{DC}/2 + Pd_{BA}/2)/(2 \cdot \pi \cdot d) \quad (15)$$

Next, the equation (14) and the equation (15) are substituted into the equation (11), and the equation (11) is rearranged. This makes it possible to obtain the coordinate z by using an equation listed below.

$$z = \sqrt{R^2 - x^2 - y^2} \quad (16)$$

The process of estimating the coordinates of the portable device 100 in the local coordinate system has been described above. It is possible to estimate coordinates of the portable device 100 in the global coordinate system by combining the coordinates of the portable device 100 in the local coordinate system and coordinates of the origin in the local coordinate system relative to the global coordinate system.

Cause of Reduction in Accuracy of Estimation

As described above, the coordinates are calculated on the basis of the propagation delay time and phases. In addition, they are estimated on the basis of the first incoming waves. Therefore, accuracy of estimating the coordinates may deteriorate in a way similar to the ranging process and the angle estimation process.

(4) Estimation of Existence Region

The positional parameters may include a region including the portable device 100 among a plurality of predefined regions. For example, in the case where the region is defined by a distance from the communication unit 200, the control section 230 estimates the region including the portable device 100 on the basis of the distance R estimated through the ranging process. For another example, in the case where the region is defined by an angle with respect to the communication unit 200, the control section 230 estimates the region including the portable device 100 on the basis of the angles α and β estimated through the angle estimation process. For another example, in the case where the region is defined by the three-dimensional coordinates, the control section 230 estimates the region including the portable device 100 on the basis of the coordinates (x, y, z) estimated through the coordinate estimation process.

Alternatively, in a process specific to the vehicle 202, the control section 230 may estimate the region including the portable device 100 among the plurality of regions including the vehicle interior and the vehicle exterior of the vehicle 202. This makes it possible to provide courteous service such as providing different serves in the case where the user is in the vehicle interior and in the case where the user is in the vehicle exterior. In addition, the control section 230 may estimate the region including the portable device 100 among nearby region and faraway region. The nearby region is a region within a predetermined distance from the vehicle 202, and the faraway region is the predetermined distance or more away from the vehicle 202.

(5) Use pf Result of Estimating Positional Parameter

For example, a result of estimating the positional parameter may be used for authentication of the portable device 100. For example, the control section 230 determines that the authentication is successful and unlock a door in the case where the portable device 100 is in an area close to the communication unit 200 on a driver seat side.

3. Technical Problem

Technical problems to be solved by the present embodiment will be described with reference to FIG. 9 to FIG. 12. FIG. 9 to FIG. 12 are graphs for describing the technical problems to be solved by the present embodiment. The graph includes a horizontal axis representing a chip length that indicates the delay time, and a vertical axis representing absolute values of CIR values (such as electric power values). The chip length is duration of a single pulse. For example, in the case of forming a pulse with a bandwidth of 500 MHz, the chip length is a pulse width of approximate 2 ns.

Figure 9:
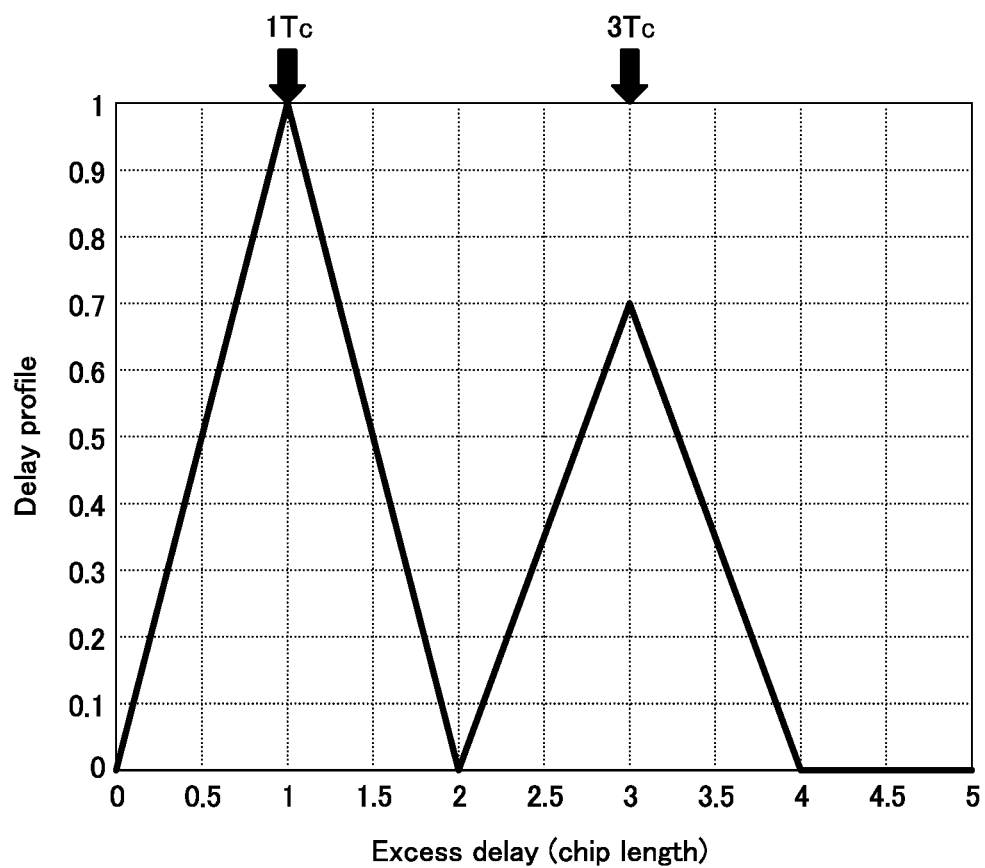
FIG. 9 is a graph for describing a technical problem to be solved by the embodiment.

FIG. 9 illustrates a CIR obtained in the case where a signal passed through a first path arrives at a delay time $1T_C$ and a signal passed through a path other than the first path arrives at a delay time $3T_C$. With reference to FIG. 9, the CIR waveform includes peaks at the respective delay times $1T_C$ and $3T_C$. Accordingly, it is understood that this CIR waveform sufficiently achieves separation of two multipath waves whose delay times are different by $2T_C$.

Figure 10:
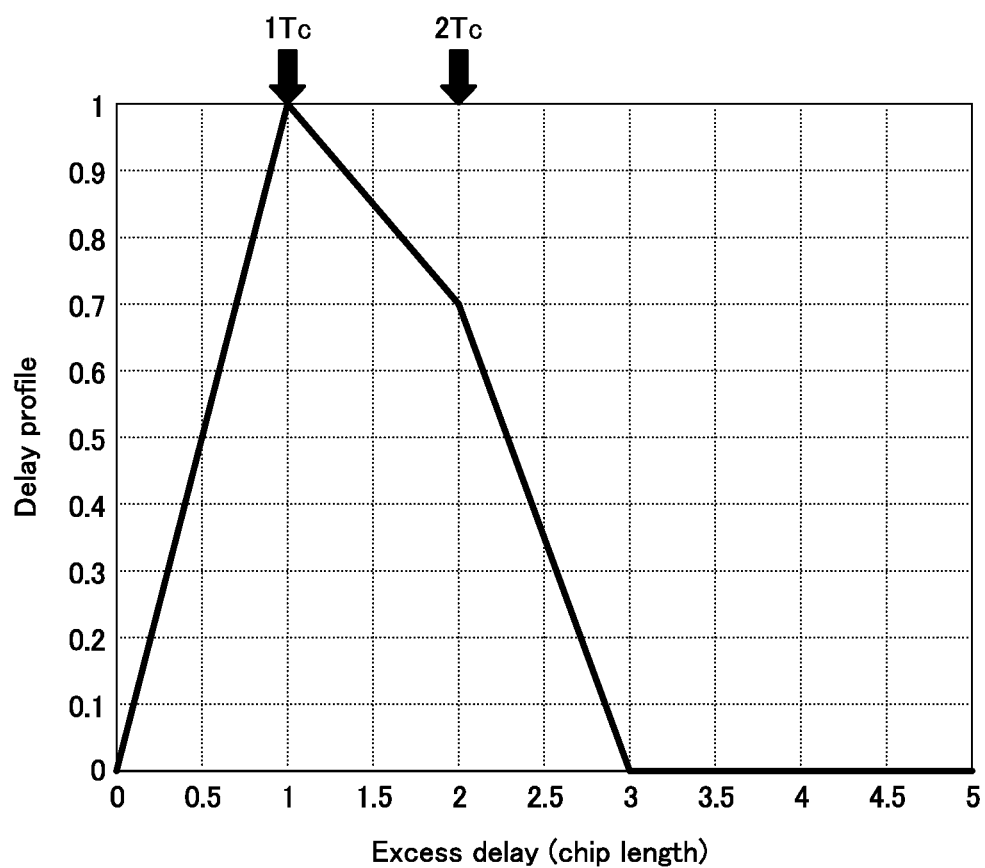
FIG. 10 is a graph for describing a technical problem to be solved by the embodiment.

FIG. 10 illustrates a CIR obtained in the case where a signal passed through a first path arrives at a delay time $1T_C$ and a signal passed through a path other than the first path arrives at a delay time $2T_C$. Note that, a phase of a signal of a first wave arriving at the delay time $1T_C$ is same as a phase of a signal of a second wave arriving at the delay time $2T_C$. With reference to FIG. 10, the CIR waveform includes a peak at the delay time $1T_C$, but does not include a peak at the delay time $2T_C$. In addition, the signal arriving at the delay time $1T_C$ and the signal arriving at the delay time $2T_C$ are combined in the same phase and appear as a single waveform. Accordingly, it is understood that it is difficult for this CIR waveform to separate two multipath waves whose delay times are different by $1T_C$.

Figure 11:
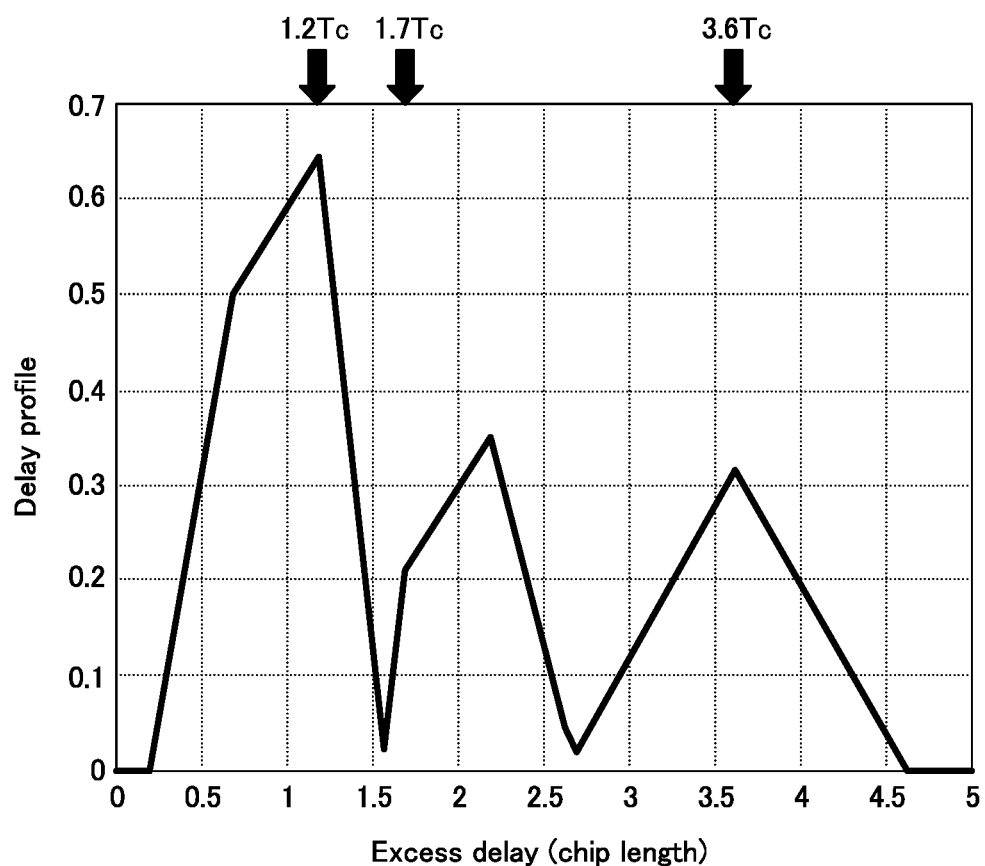
FIG. 11 is a graph for describing a technical problem to be solved by the embodiment.

FIG. 11 illustrates a CIR obtained in the case where a signal passed through a first path arrives at a delay time $1.2T_C$ and signals passed through paths other than the first path arrives at a delay time $1.7T_C$ and a delay time $3.6T_C$. Note that, a phase of a signal of a first wave arriving at the delay time $1.2T_C$ is reverse of a phase of a signal of a second wave arriving at the delay time $1.7T_C$. With reference to FIG. 11, the CIR waveform includes peaks at the respective delay times $1.2T_C$ and $3.6T_C$. On the other hand, a second peak rises near a delay time $2.2T_C$. The second peak is drastically deviated from a true delay time $1.7T_C$. Accordingly, it is understood that it is difficult for this CIR waveform to separate two multipath waves whose delay times are different by $0.5T_C$.

In the case where a difference between the delay times of the two multipath waves arriving at the receiver is short as illustrated in FIG. 10 and FIG. 11, the delay time at which a peak rises may be changed from an original delay time in the CIR waveform. Therefore, a delay time detected as the reception time of the first incoming wave may be changed from the original delay time. In this case, this change deteriorates the accuracy of ranging.

Figure 12:
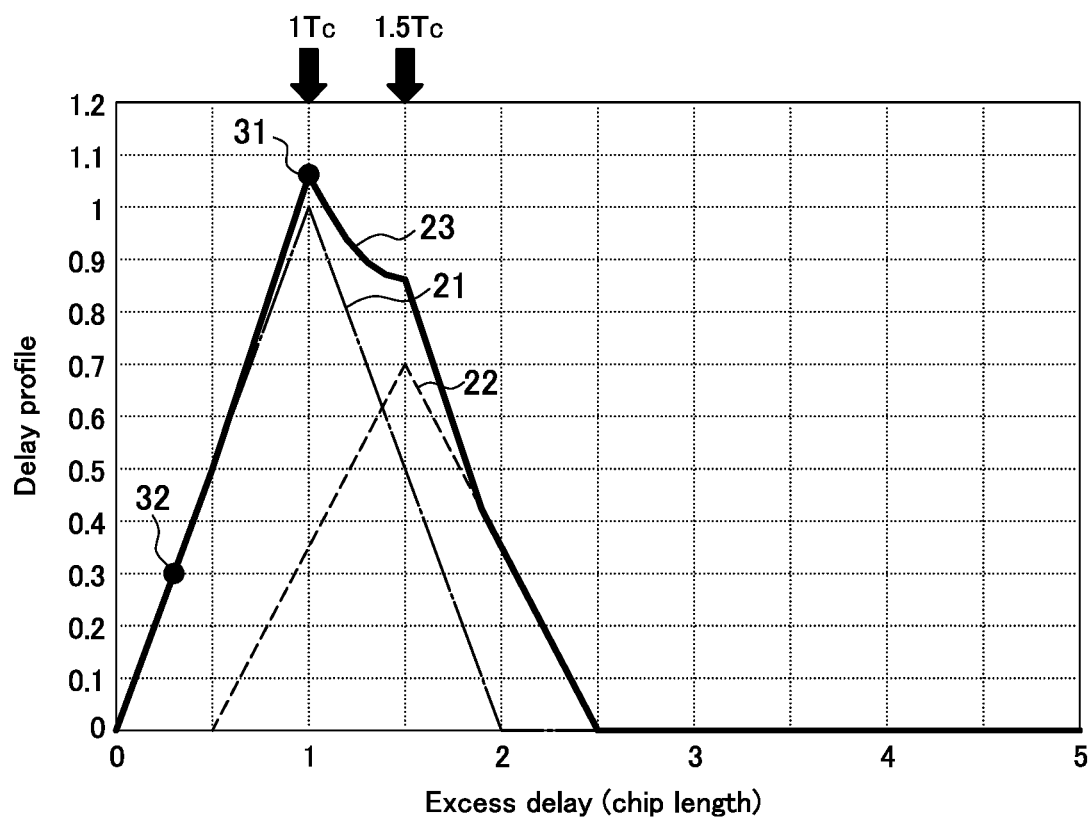
FIG. 12 is a graph for describing a technical problem to be solved by the embodiment.

FIG. 12 illustrates a CIR waveform 23 obtained in the case where a signal passed through a first path arrives at a delay time $1T_C$ and a signal passed through a path other than the first path arrives at a delay time $1.5T_C$. A CIR waveform 21 is a CIR waveform obtained in the case where a signal passed through a first path is received alone at the delay time $1T_C$. A CIR waveform 22 is a CIR waveform obtained in the case where a signal passed through a path other than the first path is received alone at the delay time $1.5T_C$. Note that, a phase of a signal of a first wave arriving at the delay time $1T_C$ is different from a phase of a signal of a second wave arriving at the delay time $2T_C$ by 90 degrees.

In the case where the difference between the delay times of the two multipath waves arriving at the receiver is short, sometimes the delayed wave or the combined wave may be detected as the first incoming wave. In the example illustrated in FIG. 12, the combined wave is detected as the first incoming wave. Typically, phases of the delayed wave and the combined wave are different from the phase of the direct wave. This difference deteriorates accuracy of angle estimation.

In the case where the combined wave obtained by combining the direct wave and the delayed wave is detected as the first incoming wave as illustrated in FIG. 12, the delayed wave is combined and a phase is drastically changed at a sampling point 31 near a peak. Accordingly, accuracy of estimation deteriorates if an angle is estimated on the basis of the phase of the sampling point 31.

On the other hand, the delayed wave is less influential at a sampling point with lower electric power before the peak such as a sampling point 32, change in the phase becomes small. However, the electric power value is reduced in exchange for reduction in the influence of the delayed wave. This increases influence of noise, and the accuracy of estimation is reduced by this increase.

Therefore, it is desirable to separate the multipath waves with higher resolution than the CIR.

4. Technical Features

<4.1 Detection of First Incoming Wave>

The portable device 100 and the communication unit 200 detects the first incoming wave through a process to be described in detail below. Hereinafter, for example, a case where the communication unit 200 serves as a detector of the first incoming wave will be described. The process to be described below may be executed by the portable device 100.

(1) Formulation of Delay Profile

First the delay profile (that is, CIR) is formulated through a pseudo-noise (PN) correlation method. The PN correlation method is a method of transmitting a signal including a random sequence such as a PN series signal shared between the transmitter and the receiver and calculating a CIR by correlating a transmission signal with a reception signal through sliding correlation. Note that, the PN series signal is a signal including 1 and 0 that are randomly arranged.

Hereinafter, it is assumed that a PN series signal u(t) of unit amplitude is transmitted as the transmission signal (for example, preamble symbol of angle estimation signal and ranging signal). The unit amplitude is designated amplitude that is known by the transmitter and the receiver.

In addition, hereinafter, it is assumed that an antenna of the receiver receives multipath waves of L waves as signals corresponding to a transmission signal transmitted from the transmitter. The multipath waves are signals that pass through a plurality of paths and is received by the receiver. In other words, when the transmitter transmits the single signal, the receiver receives L number of signals passed through the plurality of paths.

In this case, the reception signal x(t) is expressed in an equation listed below.

$$x(t) = \sum_{i=1}^{L} h_i u(t - T_{0i}) e^{-j2\pi f T_{0i}} + v(t) \tag{17}$$

Here, t is time, $h_i$ is a complex response value of an i-th multipath wave, $T_{0i}$ is propagation delay time of the i-th multipath wave, f is frequency of a carrier wave of the transmission signal, and v(t) is internal noise. The internal noise is noise generated inside a circuit of the receiver.

For example, as expressed in an equation listed below, the reception signal x(t) is correlated with a transmission signal u(t) through the PN correlation method by shifting time of the transmission signal u(t), which is known by the receiver.

$$z(\tau) = \frac{1}{T} \int_0^T u^*(t - \tau)x(t)dt \tag{18}$$

Note that, u*( ) is complex conjugate of u( ).

$z(\tau)$ is also referred to as the delay profile. In addition, $|z(\tau)|^2$ is also referred to as power delay profile. $\tau$ is delay time.

The delay profile when the multipath waves of the L waves is received is expressed in an equation listed below.

$$z(\tau) = \sum_{i=1}^{L} h_i e^{-j2\pi f T_{0i}} r(\tau - T_{0i}) + n(\tau) \tag{19}$$

Here, $r(\tau)$ is an autocorrelation function of the PN series signal. The autocorrelation function is a function of correlating a signal with the signal itself. $r(\tau)$ is given by an equation listed below.

$$r(\tau) = \frac{1}{T} \int_0^T u^*(t - \tau)u(t)dt \tag{20}$$

In addition, $n(\tau)$ is an internal noise component. $n(\tau)$ is given by an equation listed below.

$$n(\tau) = \int_0^T u^*(t - \tau)v(t)dt \tag{21}$$

(2) Sparse Reconstruction

The number of samples of the reception signal is assumed to be M (where M>L). In addition, it is assumed that the reception signal is sampled at M number of discrete delay times $\tau_1, \tau_2, \ldots,$ and $\tau_M$. Note that, the discrete delay times express delay times as discrete values. $z(\tau)$ is the delay profile calculated on the basis of the reception signal sampled at the discrete delay time $\tau$. A data vector z including the M number of delay profiles is expressed in an equation listed below. Note that, the equation listed below indicates a case where the receiver receives only one preamble symbol.

$$z=[z(\tau_1),z(\tau_2), \ldots ,z(\tau_M)]^T \tag{22}$$

In the case where the multipath waves of the L waves are received, the data vector z is expressed in equations listed below.

$$z = \sum_{i=1}^{L} h_i e^{-j2\pi f T_{0i}} r(T_{0i}) + n \tag{23}$$

$$r(\tau)=[r(\tau_1-\tau),r(\tau_2-\tau), \ldots ,r(\tau_M-\tau)]^T \tag{24}$$

$$n=[n(\tau_1),n(\tau_2), \ldots ,n(\tau_M)]^T \tag{25}$$

Note that, $r(\tau)$ is referred to as a mode vector.

In addition, the data vector z is expressed in equations listed below as a matrix expression.

$$z = A_0 s_0 + n \in \mathbb{C}^M \qquad (26)$$

$$A_0 = [r(T_{01}), r(T_{02}), \ldots, r(T_{0L})] \in \mathbb{C}^{M \times L} \qquad (27)$$

$$s_0 = [h_1 e^{-j2\pi f T_{01}}, h_2 e^{-j2\pi f T_{02}}, \ldots, h_L e^{-j2\pi f T_{0L}}]^T \in \mathbb{C}^L \qquad (28)$$

Here, $A_0$ is also referred to as a modal matrix.

In addition, $S_0$ is also referred to as a signal vector.

Through sparse reconstruction, the data vector z is converted into a format including a matrix product of A and s.

$$z = As + n \in \mathbb{C}^M \qquad (29)$$

$$A = [r(T_1), r(T_2), \ldots, r(T_N)] \in \mathbb{C}^{M \times N} \qquad (30)$$

$$s = [s_1, s_2, \ldots, s_N]^T \in \mathbb{C}^N \qquad (31)$$

$T_1, T_2, \ldots, T_N$ represents N number of delay times, which are search targets. $T_1, T_2, \ldots, T_N$ are also referred to as delay time bins. A delay time bin is an example of set time. Note that, $N \gg L$.

Here, A is also referred to as an expanded modal matrix. The expanded modal matrix is a matrix including a plurality of elements indicating the delay profile obtained on an assumption that respective signals are received in a plurality of delay time bins. For example, $r(T_1)$ that is an element of the expanded modal matrix A is a delay profile of a signal obtained on an assumption that the signal is received at time $T_1$.

In addition, S is also referred to as an expanded signal vector. The expanded signal vector is a vector including a plurality of element, each of which indicates whether or not there is a signal received in each delay time bin and amplitude and a phase of the signal.

(3) Estimation of Propagation Delay Time Based on Expanded Signal Vector

By using the sparse reconstruction, delay profile z is modeled in a format of As+n. This makes it possible to find the expanded signal vector x by solving an underdetermined problem where an unknown number is N and a condition number is M (where M<N). The control section 230 estimates reception time of the first incoming wave on the basis of the delay time bins corresponding to the plurality of elements of the expanded signal vector s.

Here, nonzero elements of the expanded signal vector indicate that there are signals in the delay time bins corresponding to the nonzero elements. On the other hand, zero elements of the expanded signal vector indicate that there is no signal in the delay time bins corresponding to the zero elements. Therefore, the control section 230 estimates the delay time bin corresponding to the nonzero element as reception time of the first incoming wave among the delay time bins corresponding to the plurality of elements of the expanded signal vector s.

At this time, the control section 230 estimates a sparse solution of the expanded signal vector s and estimates the delay time bin corresponding to the nonzero element of the sparse solution as reception time of the first incoming wave. The sparse solution is a vector including a predetermined number of the nonzero elements. The predetermined number is a number of pulses included in the reception signal as pulses corresponding to the single pulse included in the transmission signal. In other words, in the case where the multipath waves of the L waves are received, the sparse solution include L number of nonzero elements and the other elements in the sparse solution are zero. For example, in the case where $s_2$ is the nonzero element in $s=[s_1, s_2, \ldots, s_N]$, it is determined that a signal is received at a delay time $T_2$.

In particular, the control section 230 estimates a delay time bin corresponding to an earliest delay time bin as a reception time of the first incoming wave among the delay time bins corresponding to nonzero elements included in the elements of the expanded signal vector s. For example, in the case where $s_2$ $s_4$, and $s_6$ are the nonzero elements in $s=[s_1, s_2, \ldots, s_N]$, it is determined that a signal passed through a first path is received at a delay time $T_2$ and signals passed through paths other than the first path are received at delay times $T_4$ and $T_6$.

Resolution of the signal found by a model reconstructed through the sparse reconstruction is decided by magnitude of N used for the modelization in the sparse reconstruction (in other words, the number of elements of the expanded signal vector s). Therefore, by increasing the number of N at the time of the sparse reconstruction, it is possible to separate the multipath waves with resolution finer than the CIR. Accordingly, the present embodiment uses N number of the delay time bins, which is larger than M number of samples of the reception signal. In other words, time intervals between the N number of delay time bins $T_1, T_2, \ldots$, and $T_N$ are shorter than time intervals between the M number of discrete delay times $\tau_1, \tau_2, \ldots$, and $\tau_M$. Such a configuration makes it possible to separate the multipath waves with resolution finer than the intervals between samples of the reception signal. As a result, it is possible to find the reception time of the first incoming wave with the resolution finer than the CIR.

(4) Compression Sensing Algorithm

The control section 230 estimates the expanded signal vector s that is the sparse solution by using a compression sensing algorithm. The compression sensing algorithm is an algorithm for assuming that an unknown vector is a sparse vector and estimating the unknown vector on the basis of linear observation of the unknown vector. According to the present embodiment, the expanded signal vector s is an example of the unknown vector. The linear observation is acquisition of a result of multiplying the unknown vector by a coefficient. According to the present embodiment, the expanded modal matrix A is an example of the coefficient. The delay profile z is an example of the linear observation.

Examples of the compression sensing algorithm include a FOcal Underdetermined System Solver (FOCUSS), an iterative shrinkage/thresholding algorithm (ISTA), a fast ISTA (FISTA), and the like. In particular, the FOCUSS is an algorithm for assuming an initial value of the unknown vector and iteratively estimating the unknown vector by using a generalized inverse matrix and a weighing matrix. In the case of the FOCUSS, it is possible to accurately estimate the unknown vector with a small number of iterations by using the generalized inverse matrix and the weighting matrix. Details of a basic principle of the FOCUSS are described in a first non-patent document: Irina F. Gorodnitsky, Member, IEEE, and Bhaskar D. Rao, "Sparse Signal Reconstruction from Limited Data Using FOCUSS: A Reweighted Minimum Norm Algorithm", IEEE TRANSACTIONS ON SIGNAL PROCESSING, VOL. 45, NO. 3, MARCH 1997.

Another example of the compression sensing algorithm includes a FOCUSS with multiple measurement vectors (M-FOCUSS) obtained by expanding the above-described FOCUSS. The M-FOCUSS is an algorithm for parallelly applying the FOCUSS to a plurality of unknown vectors. Details of a basic principle of the M-FOCUS S are described in a second non-patent document: Shane F. Cotter, et al; "Sparse Solutions to Linear Inverse Problems With Multiple Measurement Vectors", IEEE Transactions on Signal Processing, vol. 53, No. 7, July 2005, pp. 2477-2488.

The control section 230 according to the present embodiment estimates reception time of the first incoming wave by using the M-FOCUSS. Therefore, the control section 230 first performs the sparse reconstruction to enable the M-FOCUSS. Specifically, the control section 230 converts a data matrix obtained by expanding the data vector z with respect to the plurality of wireless communication sections 210, into a format of a matrix product of the expanded modal matrix and an expanded signal matrix obtained by expanding the expanded signal vector s with respect to the plurality of wireless communication sections 210. Next, the control section 230 estimates an expanded signal matrix that satisfies a predetermined condition by using the M-FOCUSS, and estimates the reception time of the first incoming wave on the basis of a result of the estimation.

Redefinition of Equations Related to Sparse Reconstruction

In the above description, the CIR is calculated with regard to the reception signal received by the single wireless communication section 210, and formulation is performed in the case where the sparse reconstruction is performed. Next, formulation is performed with regard to a plurality of reception signals received by the plurality of wireless communication sections 210.

In the case where a transmission signal is transmitted by the portable device 100, the control section 230 correlates the transmission signal and reception signals, which are received by the plurality of wireless communication sections 210, at a designated interval after respective timings set with regard to the plurality of wireless communication sections 210, and calculates respective CIRs with regard to the plurality of wireless communication sections 210. The respective timings set with regard to the plurality of wireless communication sections 210 mean respective counting start times of time counters of the plurality of wireless communication sections 210. Next, description will be given on the assumption that the plurality of wireless communication sections 210 have a same counting start time. In other words, it is assumed that the plurality of wireless communication sections 210 are in synchronization with each other. Of course, the plurality of wireless communication sections 210 may be asynchronous with each other.

It is assumed that K represents the number of wireless communication sections 210 (that is, the number of antennas 211), and k represents an index indicating an individual antenna 211. The following equation represents $z_k(\tau)$, which indicates a CIR obtained by correlating a transmission signal with a reception signal received by a k-th antenna.

$$z_k(\tau) = \int_0^T u^*(t-\tau)x_k(t)dt \tag{32}$$

Here, $x_k(t)$ represents the reception signal received by the k-th antenna.

The following equation represents a data vector $z^{(k)}$ obtained by discretizing the CIR of the k-th antenna with the sampling number M.

$$z^{(k)} = [z_k(\tau_1), z_k(\tau_2), \ldots, z_k(\tau_M)]^T \tag{33}$$

$$= A_s B_k s_s + n^{(k)}$$

$$= A_s y_s^{(k)} + n^{(k)} \in \mathbb{C}^{M \times 1}$$

Here, $A_s$ represents a modal matrix including a column of all modal vectors of an L wave. The following equations represent $A_s$.

$$A_s = [r(T_{01}), r(T_{02}), \ldots, r(T_{0L})] \in \mathbb{C}^{M \times L} \tag{34}$$

$$r(T_{0i}) = [r(\tau_1 - T_{0i}), r(\tau_2 - T_{0i}), \ldots, r(\tau_M - T_{0i})]^T \in \mathbb{C}^{M \times 1} \tag{35}$$

In addition, $s_s$ represents a signal vector of a reference antenna among K number of antennas. The following equation represents $s_s$.

$$s_s = [h_1 e^{-j2\pi f T_{01}}, h_2 e^{-j2\pi f T_{02}}, \ldots, h_L e^{-j2\pi f T_{0L}}]^T \in \mathbb{C}^{L \times 1} \tag{36}$$

In addition, $B_k$ represents a diagonal matrix indicating a phase difference between the k-th antenna and the reference antenna. The following equation represents $B_k$.

$$B_k = \text{diag}[e^{-j r_{k1}}, \ldots, e^{-j r_{kL}}] \tag{37}$$

Here, $r_{kL}$ represents a phase difference generated depending on an arrival angle obtained when an L-th pulse is received by the k-th antenna. The phase difference is delay in a phase compared with the reference antenna. For example, with reference to FIG. 13, description will be given with regard to $B_k$ obtained in the case where K=4 and four antennas 211 constitute a 2×2 planner array.

Figure 13:
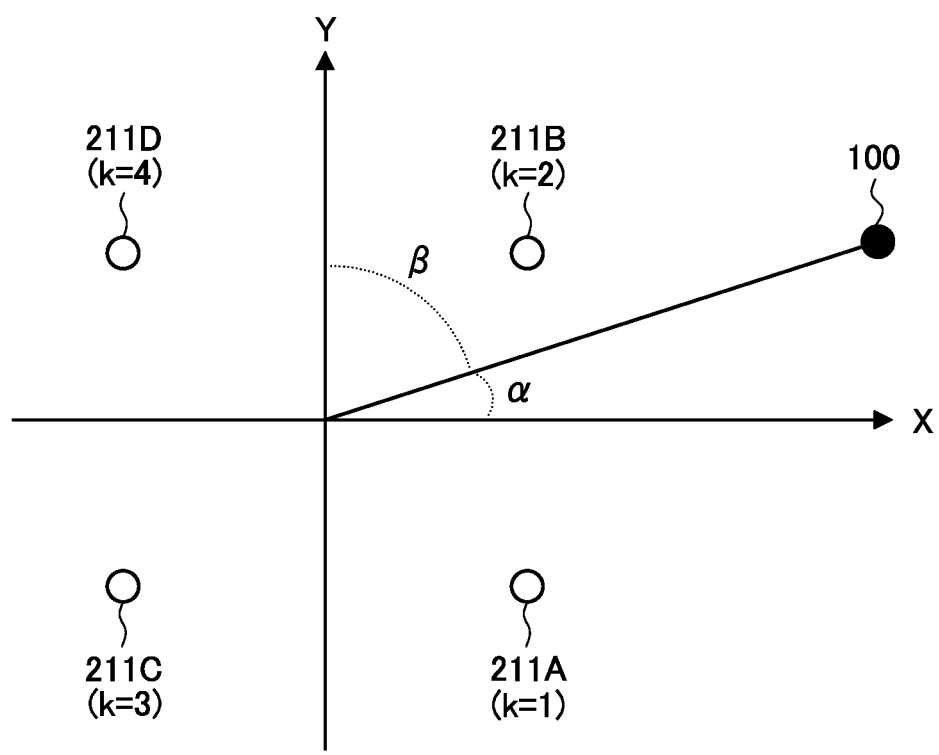
FIG. 13 is a diagram for describing a case where four antennas constitute a 2×2 planner array.

FIG. 13 is a diagram for describing the case where the four antennas 211 constitute the 2×2 planner array. As illustrated in FIG. 13, antenna 211A to antenna 211D constitute the 2×2 planner array. α represents an angle between an X axis and an arrival direction of a reception signal (that is, a straight line connecting the portable device 100 to the origin. β represents an angle between a Y axis and the arrival direction of the reception signal. In addition, the antenna 211A is referred to as a first antenna (that is, k=1), the antenna 211B is referred to as a second antenna (that is, k=2), the antenna 211C is referred to as a third antenna (that is, k=3), and the antenna 211D is referred to as a fourth antenna (that is, k=4). The following equations represents $B_k$ in the case where the first antenna (k=1) serves as the reference antenna.

$$B_1 = \text{diag}[e^{-j0}, \ldots, e^{-j0}] \tag{38}$$
$$= \text{diag}[1, \ldots, 1] = I$$

$$B_2 = \text{diag}\left[e^{-j\frac{2\pi}{\lambda}d\cos\beta_1}, \ldots, e^{-j\frac{2\pi}{\lambda}d\cos\beta_L}\right] \tag{39}$$

$$B_3 = \text{diag}\left[e^{-j\frac{2\pi}{\lambda}d\cos\alpha_1}, \ldots, e^{-j\frac{2\pi}{\lambda}d\cos\alpha_L}\right] \tag{40}$$

$$B_4 = \text{diag}\left[e^{-j\left(\frac{2\pi}{\lambda}d\cos\alpha_1 + \frac{2\pi}{\lambda}d\cos\beta_1\right)}, \ldots, e^{-j\left(\frac{2\pi}{\lambda}d\cos\alpha_L + \frac{2\pi}{\lambda}d\cos\beta_L\right)}\right] \tag{41}$$

Note that, I is an identity matrix.

In addition, $n^{(k)}$ is an internal noise vector of the k-th antenna.

In addition, $y_s^{(k)}$ is a signal vector of the k-th antenna. The following equation represents $y_s^{(k)}$ by using $B_k$ and $s_s$.

$$y_s^{(k)} = B_k s_s \in \mathbb{C}^{L \times 1} \tag{42}$$

Through the sparse reconstruction, the data vector $z^{(k)}$ is converted into a format including a matrix product of the expanded modal matrix A and $y^{(k)}$.

$$z^{(k)} = A y^{(k)} + n^{(k)} \tag{43}$$

Here, A is the expanded modal matrix. In addition, $y^{(k)}$ corresponds to the above-described expanded signal vector of the k-th antenna.

Application of M-FOCUSS

The following equation represents conversion of Z into the format including the matrix product of A and Y. This conversion is performed when the above-described equation

(43) is expanded with respect to the plurality of wireless communication sections 210 regardless of the internal noise.

$$Z=AY \qquad (44)$$

z represents a matrix including an array of K number of data vectors $z^{(k)}$. In other words, z represents a vector obtained by arraying CIRs with respect to the plurality of wireless communication sections 210. The respective CIRs are obtained with respect to the plurality of wireless communication sections 210. Z is also referred to as a data matrix. The following equation represents Z.

$$Z=[z^{(1)}, \ldots ,z^{(K)}] \in \mathbb{C}^{M \times K} \qquad (45)$$

Y represents a matrix obtained by arraying expanded signal vectors with respect to the plurality of wireless communication sections 210. The respective expanded signal vectors are obtained with respect to the plurality of wireless communication sections 210. Y is also referred to as an expanded signal matrix. The following equation represents Y.

$$Y = [y^{(1)}, \ldots , e^{(K)}] \qquad (46)$$
$$= [y^T[1], \ldots , y^T[K]], \in \mathbb{C}^{M \times K}$$

Here, $y^{(k)}$ represents a k-th column vector of the expanded signal matrix Y. On the other hand, y[i] represents an i-th row vector of the expanded signal matrix Y. Details of a relation between $y^{(k)}$ and y[i] will be described with reference to FIG. 14.

Figure 14:
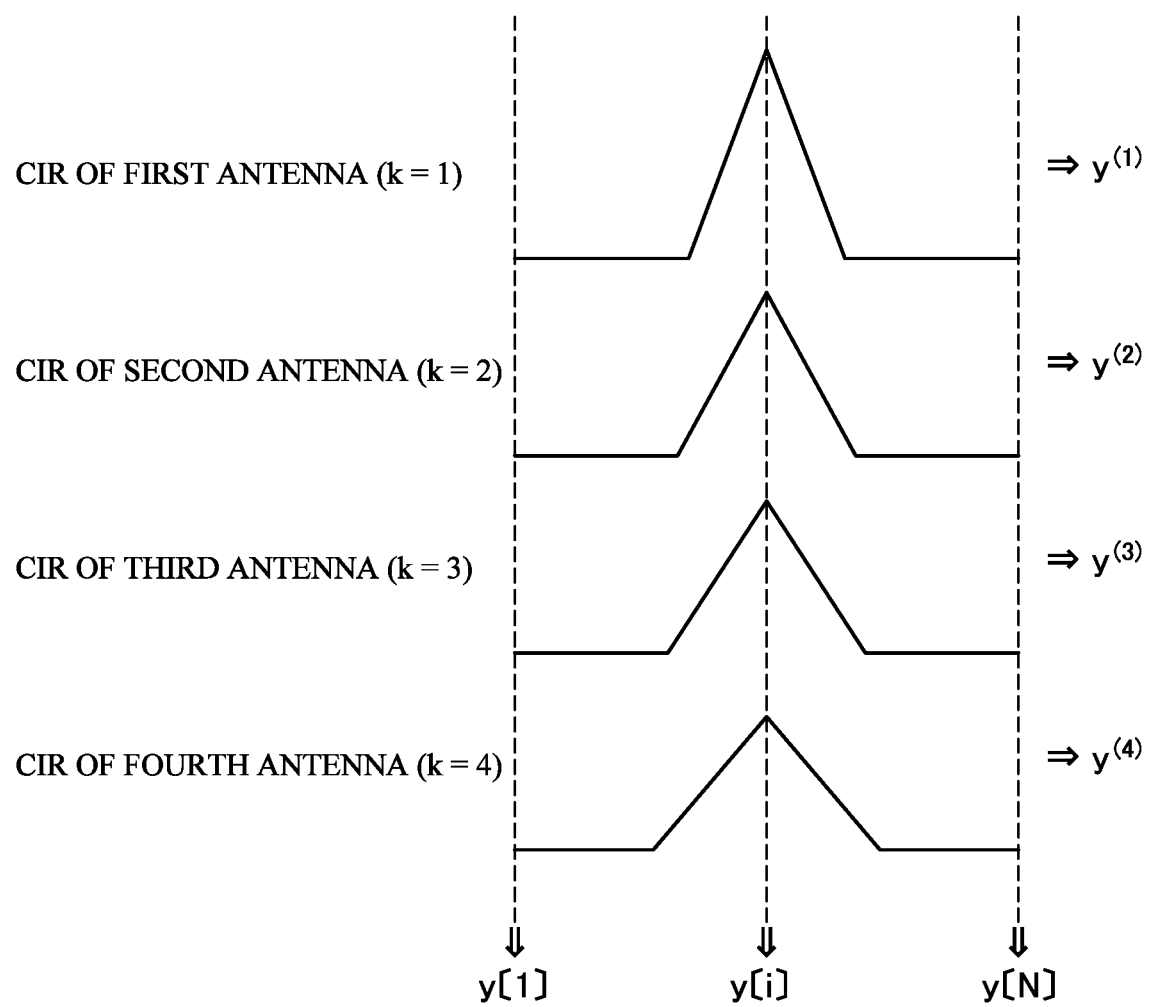
FIG. 14 is a diagram for describing a relation between y(k) and y[i].

FIG. 14 is a diagram for describing the relation between $y^{(k)}$ and y[i]. As illustrated in FIG. 14, $y^{(k)}$ represents an expanded signal vector corresponding to a CIR of the k-th antenna. Specifically, $y^{(1)}$ is an expanded signal vector corresponding to a CIR of the first antenna (that is, k=1). $y^{(2)}$ is an expanded signal vector corresponding to a CIR of the second antenna (that is, k=2). $y^{(3)}$ is an expanded signal vector corresponding to a CIR of the third antenna (that is, k=3). $y^{(4)}$ is an expanded signal vector corresponding to a CIR of the fourth antenna (that is, k=4). On the other hand, y[i] represents a vector including an array of elements corresponding to i-th delay time with regard to the CIRs of the all antennas. For example, y[1] is a vector including an array of elements corresponding to a delay time bin $T_1$ with regard to the four CIRs. y[N] represents a vector including an array of elements corresponding to a delay time bin $T_N$ with regard to the four CIRs.

The control section 230 estimates an expanded signal matrix Y that minimizes a predetermined norm. In this case, the control section 230 minimizes the predetermined norm and estimates the expanded signal matrix Y serving as a sparse solution when the above-described equation (44) is satisfied.

The predetermined norm is a norm of a vector obtained by arraying values with respect to the plurality of set times. The values are obtained by carrying out predetermined computation on a plurality of elements corresponding to the same set time among elements included in the expanded signal matrix. In other words, the predetermined norm may be a norm of a vector obtained by arraying N number of values obtained by carrying out the predetermined computation on a plurality of elements included in y[i].

For example, the predetermined computation may be taking of square roots of values obtained by summing squares of the plurality of elements corresponding to the same set time. In this case, the predetermined norm may be a norm of an N-dimensional vector, which is represented by the following formula.

$$[\|y^T[1]\|_2, \ldots ,\|y^T[N]\|_2]^T \qquad (47)$$

For another example, averaging may be used as the predetermined computation.

Here, the norm is the length of the vector. The norm may be an Lp-norm. The following equation represents the Lp-norm.

$$\|x\|_p = |x_1|^p + |x_2|^p + \ldots + |x_n|^p \qquad (48)$$

Here, p is a constant that is 0 or more and 1 or less. However, it is assumed that $0^0=0$ in the equation (48).

Next, it is assumed that the control section 230 estimates, as the predetermined norm, the expanded signal matrix Y that minimizes an Lp-norm of a vector obtained by arraying square roots of values with respect to the plurality of set times. The values are obtained by summing squares of a plurality of elements corresponding to the same set time among elements included in the expanded signal matrix Y. Specifically, the control section 230 iteratively carries out computation on the basis of the following STEP 1 to STEP 3 to estimate the expanded signal matrix Y that minimizes the predetermined norm.

STEP 1:

$$W_m = \mathrm{diag}(\|y_{m-1}[1]\|_2^{1-p/2}, \ldots , \|y_{m-1}[N]\|_2^{1-p/2}) \qquad (49)$$

STEP 2:

$$Q_m = A_m^- Z \qquad (50)$$

with $A_m = AW_m$

STEP 3:

$$Y_m = W_m Q_m \qquad (51)$$

Here, $Y_m$ is a candidate for the expanded signal matrix Y that minimizes the predetermined norm. m represents the number of iterations. $y_{m-1}[i]$ is a vector included in $Y_{m-1}$, which is a vector including elements corresponding to an i-th delay time in the expanded signal matrix. i represents an index of the delay time. N is a maximum value of the index i of the delay time, An initial value $Y_0$ of Y. is given by the following equation.

$$Y_0 = A^- Z \qquad (52)$$

Here, $A^-$ is the generalized inverse matrix of the expanded modal matrix A. The generalized inverse matrix may be a Moore-Penrose generalized inverse matrix. Therefore, the initial value $Y_0$ is the minimum norm solution. However, the initial value $Y_0$ is not the sparse solution.

The control section 230 repeatedly performs STEP 1 to STEP 3 described above. For example, STEP 1 to STEP 3 may be repeatedly performed until $Y_m$ converges. For another example, STEP 1 to STEP 3 may be repeatedly performed a predetermined number of times. This makes it possible to estimate the expanded signal vector Y that is closer to a true value.

Estimation of Reception Time of First Incoming Wave

The control section 230 estimates reception time of the first incoming wave on the basis of the expanded signal matrix Y that minimizes the predetermined norm, which has been estimated by means of the M-FOCUSS. By using the M-FOCUSS, the expanded signal matrix Y is estimated under the condition that the expanded signal matrix Y is in alignment with the CIRs of the plurality of wireless communication sections 210. Therefore, it is possible to improve accuracy of estimating the reception time of the first incoming wave in comparison with the case of estimating the expanded signal vector s under the condition that the expanded signal vector s is in alignment with only a single CIR.

The method of estimating propagation delay time based on the expanded signal vector has been described above. In other words, the control section 230 estimates a delay time corresponding to a nonzero element of the expanded signal matrix that minimizes the predetermined norm, as the reception time of the first incoming wave. In particular, the control section 230 estimates an earliest delay time corresponding to the nonzero element of the expanded signal vector that minimizes the predetermined norm, as the reception time of the first incoming wave. Note that, the plurality of $y^{(k)}$ included in the expanded signal matrix Y include the nonzero element with regard to a common delay time.

(5) Singular Value Decomposition

When estimating the expanded signal vector s, the control section 230 may find a generalized inverse matrix $A_m^-$ of $A_m$ through singular value decomposition. At this time, the control section 230 may find ($A_m^-$) by using truncated singular value decomposition (TSVD), for example.

In this case, the control section 230 decomposes $A_m$ in the equation (50) in STEP 2 listed above into a format including a diagonal matrix through the singular value decomposition, and calculates $A_m^-$. The diagonal matrix includes singular values that are larger than a predetermined threshold. Through the singular value decomposition, $A_m$ is decomposed as expressed in the following equation.

$$A_m = U_t S_t V_t^H \tag{53}$$

Here, St represents a diagonal matrix including t number of nonzero singular values. $U_t$ represents a matrix including t number of columns of left-singular vectors corresponding to $S_t$. $V_t$ represents a matrix including t number of columns of right-singular vectors corresponding to $S_t$. t represents the number of dimensions in a signal subspace. The signal subspace is a space including a signal whose electric power is higher than a threshold. Note that, $V_t^H$ is complex conjugate transpose of the matrix $V_t$, and is also referred to as an adjoint matrix of $V_t$. In this case, $A_m^-$ is found by the following equation.

$$A_m^- = V_t S_t^{-1} U_t^H \tag{54}$$

Here, $S_t$ includes t dimension number of nonzero singular values in the signal subspace. In other words, $S_t$ is a diagonal matrix including t number of singular values. t is larger than a predetermined threshold. In addition, t is the same as L, which represents the number of multipath waves. Accordingly, it is possible to reduce influence of noise when the generalized inverse matrix is found by only using the singular values belonging to the signal subspace (in other words, large singular values) as described above. This is because a singular value that does not belong to the signal subspace (in other words, small singular value) corresponds to the noise. By reducing the influence of the noise, it is possible to find the generalized inverse matrix stably and accurately even under the influence of the noise.

(6) Regularization

In the above description, the control section 230 finds $A_m^-$ through the singular value decomposition. On the other hand, the control section 230 may perform regularization to find $A_m^-$. At this time, the control section 230 may use the following equation (55) instead of the above-listed equation (50) in STEP 2. Note that, $A_m^H$ is complex conjugate transpose of the matrix $A_m$, and is also referred to as an adjoint matrix of $A_m$.

$$Q_m = A_m^H (A_m A_m^H)^{-1} Z \tag{55}$$

with $A_m = AW_m$

However, in the case where $A_m A_m^H$ is not regular in the above-listed equation (55), it is impossible to find an inverse matrix $(A_m A_m^H)^{-1}$. Therefore, the control section 230 may use the following equation (56) instead of the above-listed equation (55) in STEP 2.

$$Q_m = A_m^H (A_m A_m^H + \alpha I)^{-1} Z \tag{56}$$

with $A_m = AW_m$

Here, $\alpha$ in the equation (56) is a positive infinitesimal. I is an identity matrix. $\alpha$ is also referred to as a regularization parameter. As expressed in the above-listed equation (56), it is possible to find the inverse matrix $(A_m A_m^H)^{-1}$ of $A_m A_m^H$ by using the regularization parameter and regularizing $A_m A_m^H + \alpha I$ even in the case where $A_m A_m^H$ is not regular. In addition, by using the regularization parameter, it is possible to easily converge $Y_m$. Note that, the first and second non-patent documents listed above also refer to regularization parameters with regard to FOCUSS and M-FOCUSS.

Note that, it is also possible to use the TSVD to find the inverse matrix $(A_m A_m^H)^{-1}$ of $A_m A_m^H$. In this case, the control section 230 decomposes $A_m A_m^H$ in the equation (55) into the format including the diagonal matrix through the singular value decomposition, and calculates $(A_m A_m^H)^{-1}$. The diagonal matrix includes singular values that are larger than a first threshold. Through the singular value decomposition, $A_m A_m^H$ is decomposed as expressed in the following equation.

$$A_m A_m^H = U_t S_t V_t^H \tag{57}$$

In this case, $(A_m A_m^H)^{-1}$ is found by the following equation.

$$(A_m A_m^H)^{-1} = V_t S_t^{-1} U_t^H \tag{58}$$

Note that, $A_m A_m^H$ is a square matrix. Accordingly, here, the singular value decomposition is also referred to as eigen value decomposition. In addition, the TSVD is also referred to as truncated eigen value decomposition (TEVD).

In the above description, the specific example of calculating $A_m^-$ has been described. Note that, in the case of using the singular value decomposition to calculate $A_m^-$, it is possible to eliminate unnecessary singular values, and sometimes calculation time may be reduced. On the other hand, in the case of using the singular value decomposition to calculate $A_m^-$, the singular values are not eliminated, and it is expected to obtain an effect of improving the accuracy of estimation.

(7) Threshold Processing

In the M-FOCUSS, threshold processing may be performed. Here, the threshold processing is a process of substituting 0 for elements that are a second threshold or less. For example, the control section 230 may substitute 0 for the element that is the second threshold or less among diagonal components included in a weighting matrix $W_m$ in the equation (49) in STEP1 described above. The second threshold may be set on the basis of a maximum value among diagonal components of the weighting matrix $W_m$. For example, the control section 230 may substitute 0 for a diagonal component in the weighting matrix $W_m$. under the condition that a ratio between the diagonal component and the maximum value is the second threshold or less.

Through the above-described threshold processing, elements that are less than the second threshold are not considered as signals but are considered as noise and is converted into zero among the elements of the expanded signal vector $Y_{om}$, when creating the weighting matrix $W_m$. This makes it possible to converge the expanded signal vector $Y_m$ much faster. In addition, it is possible to easily obtain the sparse solution because the number of nonzero elements are reduced.

<4.2. Estimation of Positional Parameter>

The communication unit 230 estimates a positional parameter on the basis of the first incoming wave detected through the above-described process.

Ranging Process

The communication unit 230 estimates a distance R between the portable device 100 and the communication unit 200 on the basis of reception times of the first incoming waves estimated through the above-described process. The method of estimating the distance R has been described above with reference to FIG. 7.

Specifically, the communication unit 200 calculates the CIR with regard to the first ranging signal, performs the sparse reconstruction, and uses the M-FOCUSS. In addition, the communication unit 200 measures an interval $INT_3$ while treating the time corresponding to the earliest delay time bin as a reception time of the first incoming wave of the first ranging signal among the delay time bins corresponding to nonzero elements included in the elements of the expanded signal vector Y estimated through the M-FOCUSS.

In a similar way, the communication unit 200 calculates the CIR with regard to the third ranging signal, performs the sparse reconstruction, and uses the M-FOCUS S. In addition, the communication unit 200 measures an interval $INT_4$ while treating the time corresponding to the earliest delay time bin as a reception time of the first incoming wave of the third ranging signal among the delay time bins corresponding to nonzero elements included in the elements of the expanded signal vector Y estimated through the M-FOCUSS.

Next, the control section 230 estimates propagation delay time on the basis of the times $T_1$ to $T_4$ and estimates the distance R. As described above, it is possible to estimate the reception time of the first incoming wave with high accuracy by using the M-FOCUSS. This makes it possible to improve accuracy of ranging.

Angle Estimation Process

The communication unit 200 estimates angles α and β on the basis of phases obtained at the reception time of the first incoming wave estimated through the above-described process. The method of estimating the angles α and β has been described above with reference to FIG. 8.

More specifically, the control section 230 estimates the angles α and β on the basis of a phase of a nonzero element included in the expanded signal matrix Y estimated through the above-described process. More specifically, the control section 230 estimates the angles α and β on the basis of a phase of an element corresponding to an earliest delay time bin among one or more nonzero elements included in the expanded signal matrix Y. For example, it is assumed that the earliest nonzero elements is obtained at a delay time $T_i$ with regard to the expanded signal matrix Y by applying the M-FOCUSS to the CIRs obtained in the case of the antenna configuration illustrated in FIG. 13. In this case, an antenna array phase difference $Pd_{AC}$ is calculated by using the following equation.

$$Pd_{AC} = Pd_A - Pd_C \quad (59)$$
$$= \text{angle}(Y(i, 1)) - \text{angle}(Y(i, 3))$$

Alternatively, the antenna array phase difference $Pd_{AC}$ may be calculated by using the following equation.

$$Pd_{AC} = Pd_A - Pd_C \quad (60)$$
$$= \text{angle}(Y(i, 1) \times (Y(i, 3)^*)$$

Note that, angle( ) represents a function for calculating a phase angle of a complex number. Y(i,k) represents an element in an i-th row and a k-th column in the expanded signal matrix Y.

Other antenna array phase differences are calculated in a way similar to the above, and angles α and β are calculated.

As described above, it is possible to estimate the reception time of the first incoming wave with high accuracy by using the M-FOCUSS. It is also possible to improve accuracy of estimating the angles by estimating the angles on the basis of the phase of the element corresponding to the accurately estimated reception time of the first incoming wave among elements included in the expanded signal matrix Y.

<4.3. Flow of Process>

Figure 15:
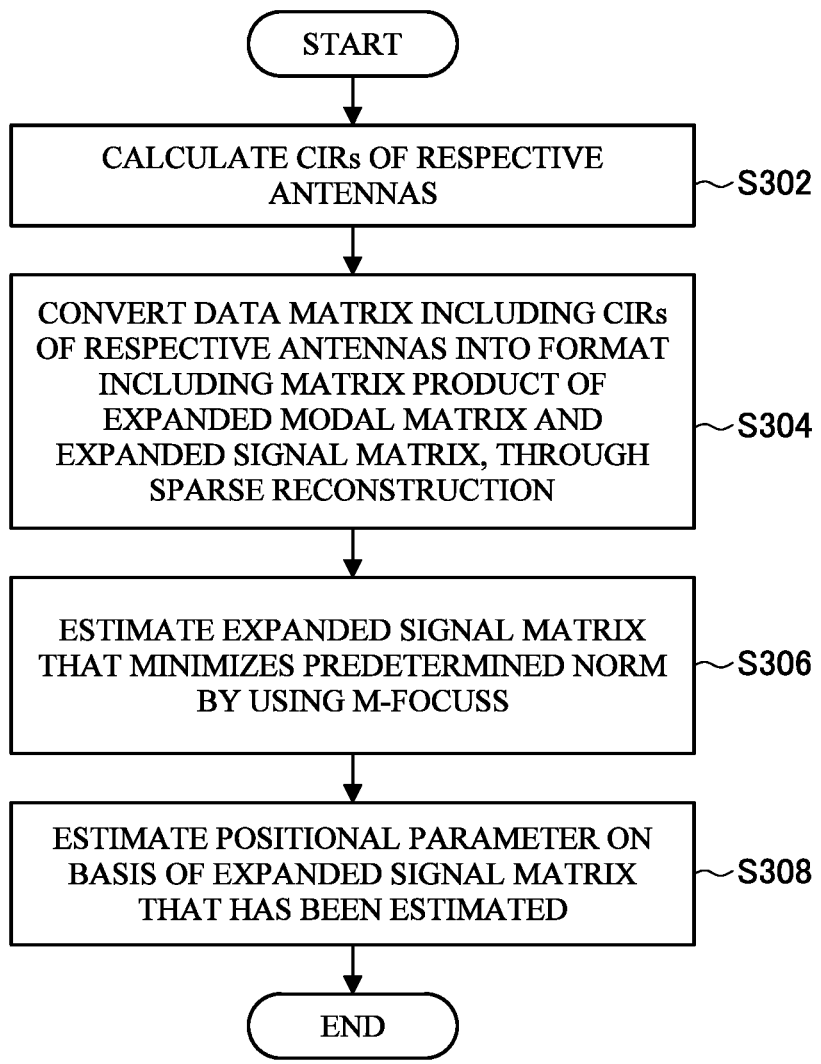
FIG. 15 is a flowchart illustrating an example of a flow of a positional parameter estimation process executed by the communication unit according to the embodiment.

FIG. 15 is a flowchart illustrating an example of a flow of a positional parameter estimation process executed by the communication unit 200 according to the present embodiment.

As illustrated in FIG. 15, the control section 230 first calculates CIRs of the respective antennas (Step S302). Next, through the sparse reconstruction, the control section 230 converts the data matrix including the CIRs of the respective antennas into the format including a matrix product of the expanded modal matrix and the expanded signal matrix (Step S304). Next, the control section 230 estimates an expanded signal matrix that minimizes a predetermined norm by using the M-FOCUSS (Step S306). Next, the control section 230 estimates a positional parameter on the basis of the expanded signal matrix that has been estimated (Step S308).

<4.4. M-FOCUSS Application Target>

As described above, the transmitter may transmit a signal including a plurality of preambles as the transmission signal. Each preamble includes one or more preamble symbols. In this case, the receiver may calculate CIRs for the respective preamble symbols by correlating the preamble symbols with respective portions of the reception signal corresponding to the plurality of preamble symbols at the designated interval after the transmitter transmits the transmission signal.

The M-FOCUSS may be applied to integrated CIRs obtained by integrating CIRs of the respective preamble symbols. On the other hand, the M-FOCUSS may be applied to a CIR of each preamble symbol.

Note that, the CIR may be calculated for each pulse. In this case, the M-FOCUSS may be applied to integrated CIRs obtained by integrating CIRs of respective pulses, or may be applied to a CIR of each pulse.

Alternatively, the CIR may be calculated with regard to the entire preamble. In this case, the M-FOCUSS may be applied to the CIR calculated with regard to the entire preamble.

It is possible to obtain similar results by using any of the methods.

<4.5. M-FOCUSS Application Range>

The M-FOCUSS may be applied to the entire CIR.

On the other hand, the M-FOCUSS may be applied to a portion of the CIR in a time axis direction. This makes it possible to reduce calculation load in comparison with the case where the M-FOCUSS is applied to the entire CIR.

In particular, to detect the first incoming wave, it is desirable to apply the M-FOCUSS to a limited portion of the CIR near the reception time of the first incoming wave. Strong correlation is obtained with regard to a portion obtained at a delay time at which a pulse sequence of the transmission signal is completely identical to a pulse sequence of the reception signal, and weak correlation is obtained with regard to the other portions. Therefore, it is possible to maintain the accuracy of detecting the first incoming wave even if the M-FOCUSS is applied to a limited portion of the CIR near the reception time of the first incoming wave.

As described above, when the M-FOCUSS is applied to the limited portion of the CIR near the reception times of the first incoming wave, it is possible to maintain the accuracy of detection and reduce the calculation load in comparison with the case where the M-FOCUSS is applied to the entire CIR.

<5. Supplement>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, the above embodiment has been described on the assumption that the CIR is the correlation computation result. However, the present invention is not limited thereto. For example, the CIR may be the reception signal itself (complex number including IQ components). The CIR value may be may be the complex number including the IQ components, which is the reception signal, the CIR value may be phase or amplitude of the reception signal, or the CIR value may be electric power that is a sum of squares of the I component and the Q component of the reception signal (or square of amplitude). In this case, the receiver detects the first incoming wave from the reception signal. For example, the receiver may use a condition that amplitude or electric power of a received wireless signal exceeds a predetermined threshold for the first time, as the predetermined detection standard for detecting the first incoming wave. In this case, the receiver may detect a signal (more specifically, sampling point) having amplitude or reception electric power that exceeds the predetermined threshold for the first time, as the first incoming wave among reception signals.

For example, in the above-described embodiment, the control section 230 calculates the CIR, detects the first incoming wave, and estimates the positional parameter. However, the present invention is not limited thereto. Any of the above-described processes may be performed by the wireless communication section 210. For example, each of the plurality of wireless communication sections 210 may calculate the CIR and detect the first incoming wave on the basis of the reception signal received by each of the plurality of wireless communication sections 210. In addition, the positional parameter may be estimated by the wireless communication section 210 that functions as the master.

For example, according to the above-described embodiment, the description has been given with reference to the example in which the angles α and β are calculated on the basis of antenna array phase differences between antennas in a pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 3, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the four antennas 211 constitute the 2×2 planner array has been described in the above embodiment, the present invention is not limited thereto. The number of antennas 211 is not limited to four. The arrangement of the antennas 211 is not limited to the planner array. For example, the plurality of antennas 211 may be arranged as a linear array. The linear array means the plurality of antennas 211 arrayed in a line. For example, an example of the linear array including the four antennas 211 will be described with reference to FIG. 16.

Figure 16:
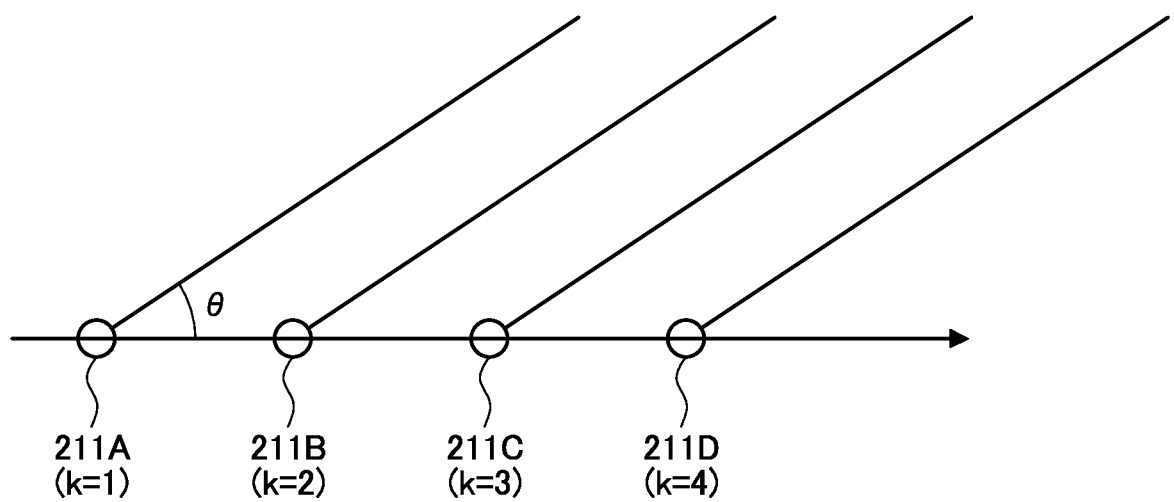
FIG. 16 is a diagram for describing a case where four antennas constitute a linear array.

FIG. 16 is a diagram for describing a case where four antennas constitute a linear array. As illustrated in FIG. 16, the antenna 211A to antenna 211D constitute the linear array. An axis on which the antenna 211A to antenna 211D are arranged serves as a coordinate axis. θ represents an angle between the coordinate axis and an arrival direction of a reception signal. In addition, the antenna 211A is referred to as a first antenna (that is, k=1), the antenna 211B is referred to as a second antenna (that is, k=2), the antenna 211C is referred to as a third antenna (that is, k=3), and the antenna 211D is referred to as a fourth antenna (that is, k=4). The following equation represents $B_k$ in the case where the first antenna (k=1) serves as the reference antenna.

$$B_k = \text{diag}\left[e^{-j\frac{2\pi}{\lambda}(k-1)d\cos\theta_{01}}, \cdots, e^{-j\frac{2\pi}{\lambda}(k-1)d\cos\theta_{0L}}\right] \in \mathbb{C}^{L \times L} \quad (61)$$

For example, in the above embodiment, the example in which the M-FOCUSS is applied to the plurality of CIRs of the plurality of wireless communication sections 210 has been described. However, the present invention is not limited thereto. The M-FOCUSS may be applied to a plurality of CIRs obtained from a single wireless communication section 210. In this case, the control section 230 converts a data matrix obtained by arraying the plurality of CIRs obtained from the single wireless communication section 210, into a format including a matrix product of the expanded modal matrix and an expanded signal matrix obtained by arraying expanded signal vectors with respect to the plurality of CIRs. Next, the control section 230 estimates the reception time of the first incoming wave by applying the M-FOCUSS to a result of such conversion. In such an example, it is possible to improve accuracy of estimating the reception time of the first incoming wave in a way similar to the above-described embodiment.

For example, the single wireless communication section 210 may receive a signal including a plurality of preambles from the portable device 100. In this case, the control section 230 calculates a single CIR with regard to a single preamble received by the wireless communication section 210. Next, the control section 230 converts the plurality of CIRs calculated from the plurality of preambles into the format including the matrix product, and apply the M-FOCUSS thereto.

For another example, the single wireless communication section 210 may receive a signal from the portable device 100 more than once. Here, the signal means a signal including one or more preambles. In this case, the control section 230 calculates a single CIR with regard to a single signal received by the wireless communication section 210. Next, the control section 230 converts the plurality of CIRs calculated from a signal that has been received more than once, into the format including the matrix product, and apply the M-FOCUSS thereto.

Note that, in the case where the M-FOCUSS is applied to the plurality of CIRs obtained from the single wireless communication section 210, the following equation represents $B_k$.

$$B_k = \text{diag}[1, \ldots, 1] = l \in \mathbb{C}^{L \times L} \quad (62)$$

For example, although the example in which the portable device 100 serves as the authenticatee and the communication unit 200 serves as the authenticator has been described in the above embodiment, the present invention is not limited thereto. The roles of the portable device 100 and the communication unit 200 may be reversed. For example, the positional parameter may be determined by the portable device 100. In addition, the roles of the portable device 100 and the communication unit 200 may be switched dynamically. In addition, a plurality of the communication units 200 may determine the positional parameters, and perform authentication.

For example, although the example in which the present invention is applied to the smart entry system has been described in the above embodiment, the present invention is not limited thereto. The present invention is applicable to any system that estimates the positional parameter and performs the authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router determines a position of a smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST

1 system
100 portable device
110 wireless communication section
111 antenna
120 storage section
130 control section
200 communication unit
202 vehicle
210 wireless communication section
211 antenna
220 storage section
230 control section

What is claimed is:
1. A communication device, comprising:
a wireless communicator configured to wirelessly receive a signal from another communication device; and
a controller configured to
correlate a first signal with a second signal at a designated interval,
convert a data matrix into a format including a matrix product of an expanded modal matrix and an expanded signal matrix,
estimate the expanded signal matrix that minimizes a predetermined norm, and
estimate reception time of the second signal on a basis of the expanded signal matrix that minimizes the predetermined norm,
wherein the second signal is a signal corresponding to the first signal and is received by the wireless communicator in a case where the another communication device transmits a signal including a pulse as the first signal,
the data matrix is a matrix including an array of a plurality of correlation computation results, each of which is a result obtained by correlating the first signal with the second signal at the designated interval with regard to the wireless communicator,
the expanded modal matrix is a matrix including a plurality of elements indicating the correlation computation results obtained on an assumption that the second signal is received at respective set times,
the expanded signal matrix is a matrix including expanded signal vectors arranged with respect to the plurality of correlation computation results, and
the expanded signal vector is a vector including a plurality of elements, each of which indicates presence/absence of the second signal obtained by the wireless communicator at each of the set times and amplitude and phase of the second signal.

2. The communication device according to claim 1,
wherein the communication device includes a plurality of the wireless communicators, and
the controller
correlates the first signal with the respective second signals, which are received by the plurality of wireless communicators, at the designated interval after respective timings set with regard to the plurality of wireless communicators, and
converts a matrix that serves as the data matrix and that includes the correlation computation results arranged with respect to the plurality of wireless communicators, into a format including a matrix product of the expanded modal matrix and a matrix that serves as the expanded signal matrix and that includes expanded signal vectors arranged with respect to the plurality of wireless communicators, each of the correlation computation results being a result obtained by correlating the first signal with the respective second signals at the designated interval with regard to the plurality of wireless communicators, the expanded signal vector being a vector including a plurality of elements, each of which indicates presence/absence of the second signal obtained by each of the wireless communicators at each of the set times and amplitude and phase of the second signal.

3. The communication device according to claim 1,
wherein the controller estimates, as the predetermined norm, the expanded signal matrix that minimizes a norm of a vector obtained by arranging values with respect to the plurality of set times, the values being obtained by carrying out predetermined computation on a plurality of elements corresponding to a same set time among elements included in the expanded signal matrix.

4. The communication device according to claim 3,
wherein the controller estimates, as the predetermined norm, the expanded signal matrix that minimizes a norm of a vector obtained by arranging square roots of values with respect to the plurality of set times, the values being obtained by summing squares of a plurality of elements corresponding to a same set time among elements included in the expanded signal matrix.

5. The communication device according to claim 4,
wherein the controller estimates the expanded signal matrix that minimizes the predetermined norm by iteratively computing an equation (1), an equation (2), and an equation (3):

$$W_m = \text{diag}(\|y_{m-1}[1]\|_2^{1-p/2}, \ldots, \|y_{m-1}[N]\|_2^{1-p/2}) \quad (1)$$

$$Q_m = A_m^- Z \quad (2)$$

where $A_m = AW_m$ $$Y_m = W_m Q_m \quad (3)$$

where $Y_m$ is a candidate for the expanded signal matrix that minimizes the predetermined norm, m is the number of iterations, $y_{m-1}[i]$ is a vector included in $Y_{m-1}$, the vector includes an element corresponding to an i-th set time in the expanded signal matrix, N is a maximum value of an index i of the set time, p is a constant that is 0 or more and 1 or less, A is the expanded modal matrix, Z is the data matrix, $W_m$ is a weighting matrix at the number of iterations m, $Q_m$ is a matrix given by the equation (2), and an initial value $Y_0$ of $Y_m$ is given by an equation (4)

$$Y_0 = A^- Z \quad (4)$$

where $A^-$ is a generalized inverse matrix of A.

6. The communication device according to claim 5,
wherein the controller decomposes $A_m$ in the equation (2) into a format including a diagonal matrix through singular value decomposition, and calculates $A_m^-$, the diagonal matrix including singular values that are larger than a predetermined threshold.

7. The communication device according to claim 6,
wherein the controller substitutes 0 for a component that is a second threshold or less among diagonal components included in $W_m$ in the equation (1).

8. The communication device according to claim 5,
wherein the controller uses an equation (5) instead of the equation (2), $$Q_m = A_m^H (A_m A_m^H)^{-1} Z \quad (5)$$

with $A_m = AW_m$
where $A_m^H$ is an adjoint matrix of $A_m$.

9. The communication device according to claim 5,
wherein the controller uses an equation (6) instead of the equation (2), $$Q_m = A_m^H (A_m A_m^H + \alpha I)^{-1} Z \quad (6)$$

with $A_m = AW_m$
where $\alpha$ is a positive infinitesimal, and I is an identity matrix.

10. The communication device according to claim 9,
wherein the controller decomposes $A_m A_m^H$ in the equation (6) into a format including a diagonal matrix through eigen value decomposition, and calculates $(A_m A_m^H)^{-1}$, the diagonal matrix including elements that are larger than a first threshold.

11. The communication device according to claim 1,
wherein an interval between the set times is shorter than the designated interval.

12. The communication device according to claim 1,
wherein the controller estimates a set time corresponding to a nonzero element in the expanded signal matrix that minimizes the predetermined norm, as reception time of the second signal.

13. The communication device according to claim 12,
wherein the controller estimates an earliest set time corresponding to the nonzero element of the expanded signal matrix that minimizes a predetermined norm, as the reception time of the second signal.

14. The communication device according to claim 1,
wherein the controller estimates a distance between the communication device and the another communication device on a basis of the estimated reception time of the second signal.

15. The communication device according to claim 1,
wherein the controller estimates an angle between a coordinate axis and a straight line connecting the another communication device to an origin of a coordinate system based on the communication device, on a basis of phase of a nonzero element included in the expanded signal matrix.

16. The communication device according to claim 15,
wherein the controller estimates the angle on a basis of phase of an element corresponding to an earliest set time among one or more nonzero elements included in the expanded signal matrix.

17. An information processing method, comprising:
correlating a first signal with a second signal at a designated interval;
converting a data matrix into a format including a matrix product of an expanded modal matrix and an expanded signal matrix;

estimating the expanded signal matrix that minimizes a predetermined norm; and estimating reception time of the second signal on a basis of the expanded signal matrix that minimizes the predetermined norm, wherein the second signal is a signal corresponding to the first signal and is received by a wireless communicator in a case where another communication device transmits a signal including a pulse as the first signal, the data matrix is a matrix including an array of a plurality of correlation computation results, each of which is a result obtained by correlating the first signal with the second signal at the designated interval with regard to the wireless communicator, the expanded modal matrix is a matrix including a plurality of elements indicating the correlation computation results obtained on an assumption that the second signal is received at respective set times, the expanded signal matrix is a matrix including expanded signal vectors arranged with respect to the plurality of correlation computation results, and the expanded signal vector is a vector including a plurality of elements, each of which indicates presence/absence of the second signal obtained by the wireless communicator at each of the set times and amplitude and phase of the second signal.

18. A non-transitory computer readable storage medium having a program stored therein, the program causing a computer to function as a controller configured to correlate a first signal with a second signal at a designated interval, convert a data matrix into a format including a matrix product of an expanded modal matrix and an expanded signal matrix, estimate the expanded signal matrix that minimizes a predetermined norm, and estimate reception time of the second signal on a basis of the expanded signal matrix that minimizes the predetermined norm, wherein the second signal is a signal corresponding to the first signal and is received by a wireless communicator in a case where another communication device transmits a signal including a pulse as the first signal, the data matrix is a matrix including an array of a plurality of correlation computation results, each of which is a result obtained by correlating the first signal with the second signal at the designated interval with regard to the wireless communicator, the expanded modal matrix is a matrix including a plurality of elements indicating the correlation computation results obtained on an assumption that the second signal is received at respective set times, the expanded signal matrix is a matrix including expanded signal vectors arranged with respect to the plurality of correlation computation results, and the expanded signal vector is a vector including a plurality of elements, each of which indicates presence/absence of the second signal obtained by the wireless communicator at each of the set times and amplitude and phase of the second signal.

\* \* \* \* \*